United States Patent
Fenger

(10) Patent No.: US 11,932,520 B2
(45) Date of Patent: Mar. 19, 2024

(54) METHOD OF MOUNTING A SELF-HOISTING CRANE ON A WIND TURBINE AND SELF-HOISTING CRANE

(71) Applicant: Liftra IP ApS, Aalborg (DK)

(72) Inventor: Per Eske Fenger, Terndrup (DK)

(73) Assignee: Liftra IP APS, Aalborg (DK)

(*) Notice: Subject to any disclaimer, the term of this patent is extended or adjusted under 35 U.S.C. 154(b) by 353 days.

(21) Appl. No.: 17/600,632

(22) PCT Filed: Mar. 31, 2020

(86) PCT No.: PCT/EP2020/059020
§ 371 (c)(1),
(2) Date: Oct. 1, 2021

(87) PCT Pub. No.: WO2020/201237
PCT Pub. Date: Oct. 8, 2020

(65) Prior Publication Data
US 2022/0250877 A1   Aug. 11, 2022

(30) Foreign Application Priority Data
Apr. 2, 2019 (DK) ............... PA201970211

(51) Int. Cl.
  *B66C 23/20* (2006.01)
  *B66C 23/18* (2006.01)
  *F03D 13/10* (2016.01)

(52) U.S. Cl.
  CPC .......... *B66C 23/207* (2013.01); *B66C 23/185* (2013.01); *F03D 13/10* (2016.05); *F05B 2230/61* (2013.01)

(58) Field of Classification Search
  CPC ................ B66C 23/207; B66C 23/185; B66C 23/20–206; B66C 23/208–348; F03D 13/10; F05B 2230/61
  See application file for complete search history.

(56) References Cited

U.S. PATENT DOCUMENTS 9,115,693 B2 * 8/2015 Fenger ............... F03D 80/50
2007/0290426 A1  12/2007 Trede et al.
(Continued)

FOREIGN PATENT DOCUMENTS

CA    2997876 A1 * 9/2018 ........... B66C 23/207
CN    101061310 A   10/2007
(Continued)

OTHER PUBLICATIONS

Indian Office Action for corresponding Indian Application No. 202117047345, dated Apr. 20, 2023, with English translation.

*Primary Examiner* — Sang K Kim
*Assistant Examiner* — Nathaniel L Adams
(74) *Attorney, Agent, or Firm* — Birch, Stewart, Kolasch & Birch, LLP

(57) ABSTRACT

The crane is hoisted from the ground to the nacelle by operating a cable winch at ground whereby a cable extends from the crane to a roller at the nacelle and to the cable winch. A hoist block with the roller is arranged on a jib at a first hoist block position above a second hinge part of a crane base and extended in horizontal direction from the nacelle. When a first hinge part of the crane is positioned at a corresponding second hinge part of the crane base, the cable extends in a downward direction directly from the roller of the hoist block and through a central opening in a pedestal. After mutual connection of the first and second hinge parts, the hoist block is removed from its first hoist block position.

20 Claims, 22 Drawing Sheets

(56) References Cited

U.S. PATENT DOCUMENTS

| | | |
|---|---|---|
| 2010/0111665 A1 | 5/2010 | Daniels |
| 2014/0010658 A1* | 1/2014 | Nielsen .................. B66C 1/108 |
| | | 29/889.1 |
| 2016/0010621 A1 | 1/2016 | Zuteck |
| 2016/0040649 A1 | 2/2016 | Smith et al. |
| 2018/0362304 A1 | 12/2018 | Fenger |
| 2022/0281722 A1* | 9/2022 | Fenger .................. B66C 23/207 |

FOREIGN PATENT DOCUMENTS

| | | |
|---|---|---|
| CN | 101798993 A | 8/2010 |
| CN | 102762849 A | 10/2012 |
| CN | 106662076 A | 5/2017 |
| CN | 108473287 A | 8/2018 |
| CN | 108996405 A | 12/2018 |
| EP | 1 239 150 A2 | 9/2002 |
| EP | 2 917 573 B1 | 6/2018 |
| KR | 10-1364614 B1 | 2/2014 |
| WO | WO 2011/050812 A1 | 5/2011 |

\* cited by examiner

METHOD OF MOUNTING A SELF-HOISTING CRANE ON A WIND TURBINE AND SELF-HOISTING CRANE

The present invention relates to a method of mounting a self-hoisting crane on a nacelle of a wind turbine, whereby the self-hoisting crane includes a pedestal, a boom arm, a hook block and at least one cable adapted to lift or lower the hook block in relation to the boom arm for operation of the self-hoisting crane in its mounted position on the nacelle, whereby the pedestal is adapted to be mounted in a mounting position on a crane base arranged on the nacelle, whereby the self-hoisting crane is hoisted from the ground to the nacelle by operating a cable winch arranged at the ground, whereby, during hoisting of the self-hoisting crane, the at least one cable extends from the hook block, out through a central opening in the pedestal, around at least one roller arranged at the crane base and to the cable winch arranged at the ground, whereby the self-hoisting crane is lifted from the ground with the pedestal pointing upwards until an intermediate first hinge part of the self-hoisting crane is positioned at a corresponding intermediate second hinge part of the crane base, whereby the intermediate first and second hinge parts are connected together and the self-hoisting crane is pivoted about a hinge axis of the intermediate first and second hinge parts, and whereby the pedestal is mounted on the crane base with the boom arm of the self-hoisting crane arranged above the pedestal for normal operation.

WO 2011/050812 A1 (Liftra ApS) discloses a self-hoisting crane adapted to be mounted on a crane base mounted on the nacelle of a wind turbine. The self-hoisting crane is lifted to the nacelle upside down by means of a winch placed on ground which pulls two wires extending upwards from the winch to the nacelle and thereby guiding the crane in that the crane is provided with rollers rolling on the wires. On the crane base, each wire passes a number of rollers and extends downwards to the self-hoisting crane in which the wires are attaches to a hook block of the crane. When the crane arrives at the nacelle of the wind turbine, the crane is mounted on the crane base. In its mounted position on the nacelle, the crane may be used for lifting heavy parts by means of the same wires that were used for lifting the crane itself, and by operating the winch on ground. The self-hoisting crane may be used for servicing and replacement of the heaviest parts located in the wind turbine nacelle. The advantage of this type of crane is that it eliminates the need for large mobile cranes at servicing of wind turbines, and thereby substantial savings may be achieved when performing these tasks.

In a known further development of the above described self-hoisting crane, because the crane is lifted to the nacelle with its pedestal pointing upwards, the crane is mounted on the nacelle by being tilted about an intermediate hinge axis established between the crane and the crane base and partly by means of a boom cylinder of the crane itself acting on the boom of the crane and partly by means of a raise cylinder which is connected between the crane and the crane base during tilting. In order to lift the crane to a position in which the intermediate hinge axis may be established, because the intermediate hinge axis of the crane is arranged at a distance from the pedestal of the crane, the wires of the crane exiting the bottom of the pedestal of the crane are led over a pair of rounded guides arranged in the pedestal and back downwards along the side of the crane to a pair of guide rollers mounted on the side of the arm base of the crane. From these guide rollers, the wires extend back upwards along the side of the crane to the system of rollers on the crane base arranged on the nacelle. By operating the winch, the guide rollers mounted on the side of the arm base may now be lifted with the crane until they reach the system of rollers on the crane base, and the intermediate hinge axis may be established in order to tilt the crane. However, when the crane has been mounted in its final position on the crane base, the guide rollers mounted on the side of the arm base have to be removed from the crane in order for the wires to pass directly into the pedestal of the crane when operating the crane. In order to do this, the wires have to be completely slacked. Because the crane is lifted by the guide rollers mounted on the side of the arm base opposed to the wind turbine tower, the crane may tend to tilt towards the wind turbine tower during hoisting and may therefore require substantially tensioned wires also when the intermediate hinge axis has been established in order to resist the load of the crane and avoid collision between the crane and the tower. Furthermore, in order to control the positioning of the centre of gravity of the crane, the use of supplemental chain hoists may be necessary during the last part of the hoisting of the crane near the nacelle.

The object of the present invention is to facilitate the mounting of a self-hoisting crane on a nacelle of a wind turbine.

In view of this object, before lifting the self-hoisting crane from the ground to the nacelle, a hoist block including the at least one roller is arranged on a jib at a first hoist block position above the intermediate second hinge part of the crane base and extended in horizontal direction from the nacelle, during lifting of the self-hoisting crane to the nacelle, when the self-hoisting crane arrives at the position whereby the intermediate first hinge part of the self-hoisting crane is positioned at the corresponding intermediate second hinge part of the crane base, the cable extends in a downward direction directly from the at least one roller of the hoist block and through the central opening in the pedestal and therefrom to the hook block, and, after mutual connection of the intermediate first and second hinge parts, the hoist block is removed from its first hoist block position on the jib.

In this way, by temporarily only during hoisting of the crane, arranging a hoist block on a jib at a first hoist block position above the intermediate second hinge part of the crane base, and thereby lifting the crane by means of a cable extending in a downward direction directly from the hoist block and through the central opening in the pedestal of the crane, a much simpler mounting procedure may be obtained. Because the cable is not redirected to the side of the crane, when arriving at the nacelle, the crane may be lifted by the cable more or less directly above its centre of gravity, thereby avoiding supplemental procedures to guide the crane in order to connect the intermediate first and second hinge parts for tilting of the crane to its mounting position. Furthermore, complicated procedures for removal of cable redirection to the side of the crane at a position difficult to access may be avoided.

In an embodiment, after mutual connection of the intermediate first and second hinge parts, the hoist block is repositioned from its first hoist block position on the jib to a second hoist block position at the mounting position of the pedestal on the crane base. Thereby, apart from being used to lift the self-hoisting crane to the nacelle, the hoist block may in addition serve to redirect the at least one cable directly into the pedestal of the crane during the normal operation of the crane in its mounted position on the nacelle. Thereby, no additional hoist block is necessary for this task, and the at least one cable may be positioned correctly both for lifting of the crane and for subsequent operation of the crane without any additional complicated operations.

In an embodiment, the hoist block is repositioned from its first hoist block position on the jib to its second hoist block position at the mounting position of the pedestal on the crane base by means of a lightweight crane arranged on the nacelle. Thereby, the mounting of the crane on the nacelle may be even further facilitated in that the hoist block may easily be accessed at its first hoist block position on the jib and be removed therefrom by means of the lightweight crane.

In an embodiment, before the hoist block is removed from its first hoist block position on the jib, at least one linear raise actuator arranged on the self-hoisting crane is activated to extend a raise arm, and a releasable pivotal connection is established between the raise arm and the crane base. Thereby, the pivotal position of the crane may be controlled by means of the at least one linear raise actuator before the tension of the at least one cable is slacked, and thereby, the mounting procedure may generally be even better facilitated.

In an embodiment, after the hoist block has been removed from its first hoist block position on the jib, the at least one linear raise actuator is activated to retract the raise arm whereby the self-hoisting crane is pivoted about the hinge axis of the intermediate first and second hinge parts. Thereby, the crane may be tilted through the first hoist block position in order to position the crane for mounting on the nacelle.

In an embodiment, after the self-hoisting crane has been pivoted about the hinge axis of the intermediate first and second hinge parts, the pedestal is connected to the crane base by means of at least one front base hinge pin, the intermediate first and second hinge parts are disconnected from each other, the at least one linear raise actuator is activated to extend the raise arm whereby the self-hoisting crane is pivoted about the at least one front base hinge pin until the final mounting position of the self-hoisting crane on the crane base is reached, and the pedestal is further connected to the crane base by means of at least one back base hinge pin. Thereby, the positioning of the crane in its final mounting position may be facilitated.

In an embodiment, during lifting of the self-hoisting crane to the nacelle, the hoist block is pivoted about a pivot axis being at least substantially perpendicular to an axis of rotation of the at least one roller of the hoist block. Thereby, the hoist block may adapt its rotational position to the varying angle of the extended part of the at least one cable with the vertical during lifting of the crane from the ground to the nacelle.

In an embodiment, before lifting the self-hoisting crane from the ground to the nacelle, the hoist block is lifted from the ground to its first hoist block position on the jib by means of a lightweight crane arranged on the nacelle, and, during lifting of the hoist block from the ground to its first hoist block position, the at least one cable of the self-hoisting crane extends from the self-hoisting crane positioned at the ground, up to the hoist block and around the at least one roller of the hoist block, and down to the cable winch on the ground. Thereby, both the hoist block and the at least one cable of the self-hoisting crane are positioned for subsequent lifting of the crane in one single operation. Thereby, the mounting of the self-hoisting crane may be further facilitated.

The present invention further relates to a self-hoisting crane adapted to be mounted on a nacelle of a wind turbine, wherein the self-hoisting crane includes a pedestal, a boom arm, a hook block and at least one cable adapted to lift or lower the hook block in relation to the boom arm for operation of the self-hoisting crane in its mounted position on the nacelle, the self-hoisting crane further including a crane base adapted to be arranged on the nacelle, wherein a free mounting end of the pedestal is adapted to be mounted in a mounting position on the crane base, wherein the self-hoisting crane is adapted to be hoisted from the ground to the nacelle by operating a cable winch arranged at the ground, wherein the at least one cable is adapted to extend from the hook block, out through a central opening in the pedestal, around at least one roller arranged at the crane base and to the cable winch arranged at the ground, wherein the self-hoisting crane is adapted to be lifted from the ground with the pedestal pointing upwards until an intermediate first hinge part of the self-hoisting crane is positioned at a corresponding intermediate second hinge part of the crane base, wherein the intermediate first and second hinge parts are adapted to be connected together in order to pivot the self-hoisting crane about a hinge axis of the intermediate first and second hinge parts, and wherein the pedestal is adapted to be mounted on the crane base with the boom arm of the self-hoisting crane arranged above the pedestal for normal operation.

The self-hoisting crane is characterised in that the at least one roller is arranged in a hoist block, in that the crane base includes a jib adapted to, during lifting of the self-hoisting crane to the nacelle, carry the hoist block at a first hoist block position above the intermediate second hinge part of the crane base and extended in horizontal direction from the nacelle, in that the vertical distance from the intermediate second hinge part of the crane base to the first hoist block position is longer than the distance from the first intermediate hinge part of the self-hoisting crane to the free mounting end of the pedestal, and in that the hoist block is releasably attached to the jib in order to be removed from its first hoist block position and thereby allow passage of the self-hoisting crane through the first hoist block position when pivoting the self-hoisting crane about the hinge axis of the intermediate first and second hinge parts.

In this way, by temporarily only during hoisting of the crane, arranging a hoist block on the jib at the first hoist block position above the intermediate second hinge part of the crane base, it is possible to lift the crane by means of the cable extending in a downward direction directly from the hoist block and through the central opening in the pedestal of the crane, and thereby a much simpler mounting procedure may be obtained. Because in this way, when arriving at the nacelle, the crane may be lifted by the cable more or less directly above its centre of gravity, supplemental procedures for guiding the crane in order to connect the intermediate first and second hinge parts for tilting of the crane to its mounting position may be avoided. Furthermore, complicated procedures for removal of cable redirection to the side of the crane at a position difficult to access may be avoided.

In an embodiment, the hoist block is adapted to, after mutual connection of the intermediate first and second hinge parts, be moved from its first hoist block position to a second hoist block position at the mounting position of the pedestal on the crane base, and the crane base is adapted to releasably receive and hold the hoist block at the second hoist block position for the operation of the self-hoisting crane in its mounted position on the nacelle. Thereby, the above-mentioned features may be obtained.

In an embodiment, the crane base and the hoist block are adapted so that the hoist block may be lifted by means of a lightweight crane arranged on the nacelle from the first hoist block position to the second hoist block position. Thereby, the above-mentioned features may be obtained.

In an embodiment, the jib and the hoist block are adapted so that the hoist block when mounted in its first hoist block position on the jib is pivotal in relation to the jib, preferably about a pivot axis being at least substantially perpendicular to an axis of rotation of the at least one roller of the hoist block. Thereby, the above-mentioned features may be obtained.

In an embodiment, the jib has two spaced arms each being provided with an upwardly open fork-like element in which a respective pivot pin of the hoist block may rest.

Thereby, the hoist block may easily be positioned in its first hoist block position on the jib and subsequently be moved from its first hoist block position to its second hoist block position by means of a lightweight crane.

In an embodiment, the hoist block is formed as an elongated element being provided at either end with extending pivot pins arranged coaxially with a longitudinal axis of the hoist block, the hoist block has two outer rollers arranged at the respective ends of the hoist block and two inner rollers arranged between the outer rollers, the outer and inner rollers are arranged with their axes at a distance from the longitudinal axis of the hoist block and at right angles to the longitudinal axis, the axes of the outer rollers are fixed in relation to the elongated element, and the axes of the inner rollers are pivotal in relation to the elongated element about an axis being parallel with or co-axial with the longitudinal axis of the hoist block. Thereby, in its first hoist block position on the jib, the hoist block may adapt its rotational position to the varying angle of the four extended parts of two cables being redirected in the hoist block with the vertical during lifting of the crane from the ground to the nacelle. Furthermore, in its second hoist block position at the mounting position of the pedestal on the crane base, two innermost cable parts extending from the hoist block and up through a central opening in the pedestal of the crane may suitably adapt their angle to the vertical by rotation of the axes of the two inner rollers about the axis being parallel with or co-axial with the longitudinal axis of the hoist block.

In an embodiment, the self-hoisting crane further includes an arm base arranged rotatably about an arm base axis on the pedestal, the arm base axis being vertical in the operational position of the self-hoisting crane, the boom arm is arranged pivotally about a boom arm axis on the arm base, the boom arm axis being horizontal in the operational position of the self-hoisting crane, a linear boom actuator is arranged between the arm base and the boom arm and is displaceable between a retracted position in which the boom arm is lowered in the operational position of the self-hoisting crane and an extended position in which the boom arm is lifted in the operational position of the self-hoisting crane, the arm base is provided with at least one base roller adapted to roll on a cable extending from a cable winch on the ground to the hoist block, a hook block end of the boom arm is provided with at least one boom arm roller adapted to roll on a cable extending from a cable winch on the ground to the hoist block, in the extended position of the linear boom actuator, a centre of gravity of the self-hoisting crane is below a straight line between the respective axes of the at least one base roller and of the at least one boom arm roller when the at least one base roller and the at least one boom arm roller roll on their corresponding cables and the linear boom actuator is positioned under the boom arm during hoisting of the self-hoisting crane to the nacelle of a wind turbine. Thereby, by arranging a centre of gravity of the self-hoisting crane below a straight line between the respective axes of the at least one base roller and of the at least one boom arm roller during hoisting of the self-hoisting crane to the nacelle, the crane may be lifted in a stable position and the hoisting procedure and subsequent mounting of the crane on the nacelle may thereby be facilitated in that additional measures for stabilising the crane during its hoisting may be dispensed with.

The invention will now be explained in more detail below by means of examples of embodiments with reference to the very schematic drawing, in which FIG. 1 is a perspective view of a wind turbine without rotor blades during lifting of a hoisting block to the nacelle by means of a lightweight crane arranged in the nacelle;

Figure 14:
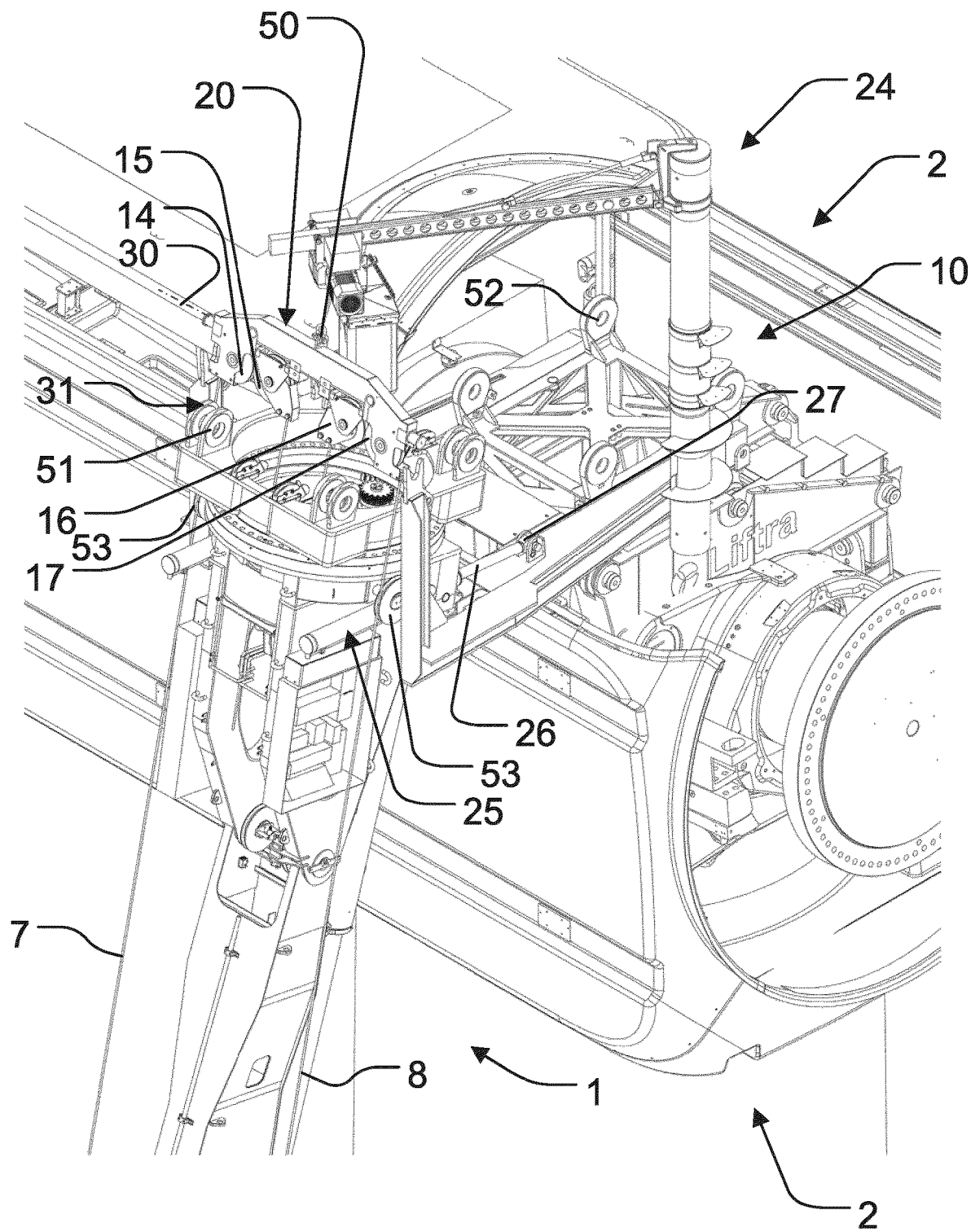
Figure 15:
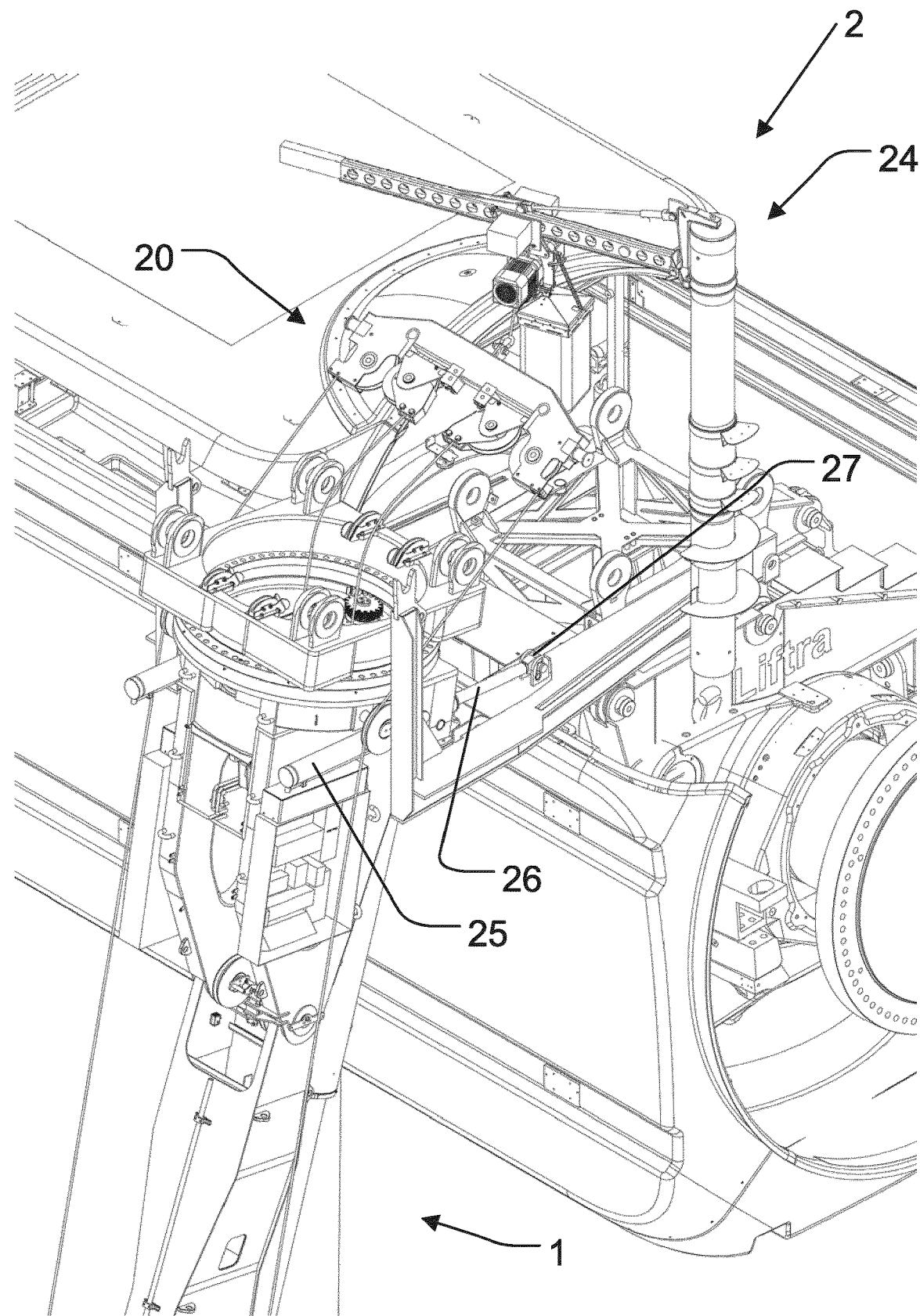
Figure 16:
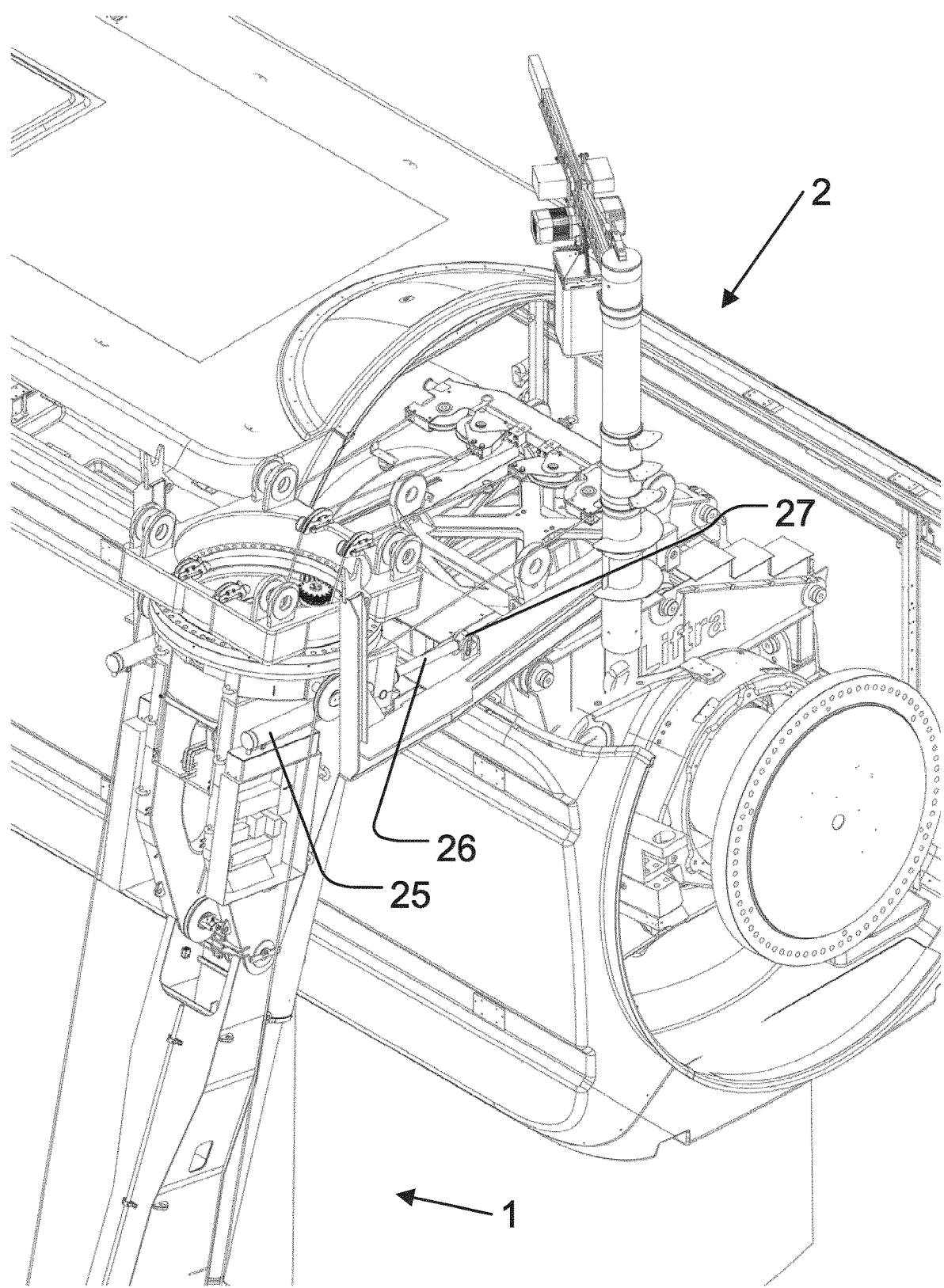
Figure 17:
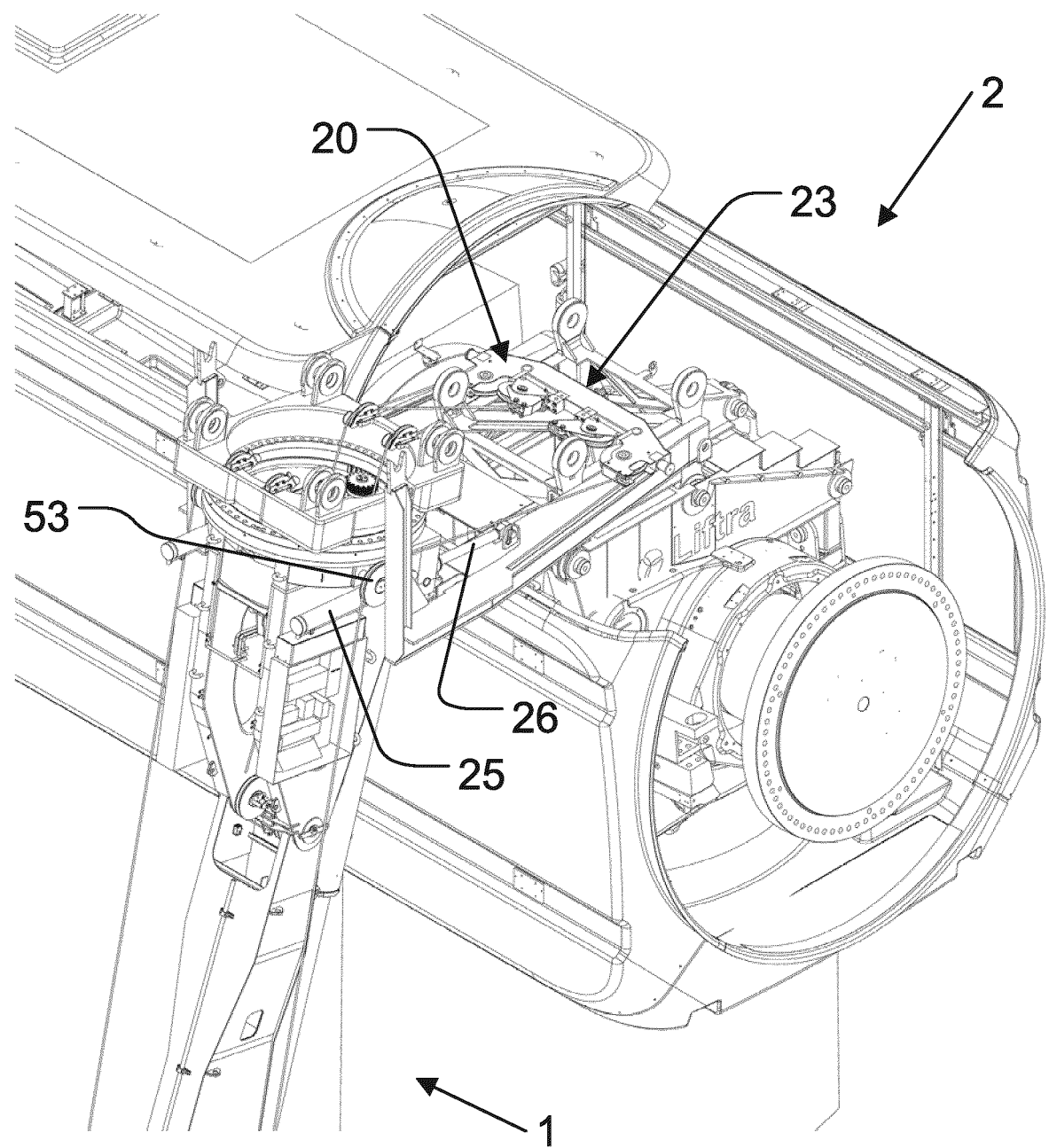
Figure 18:
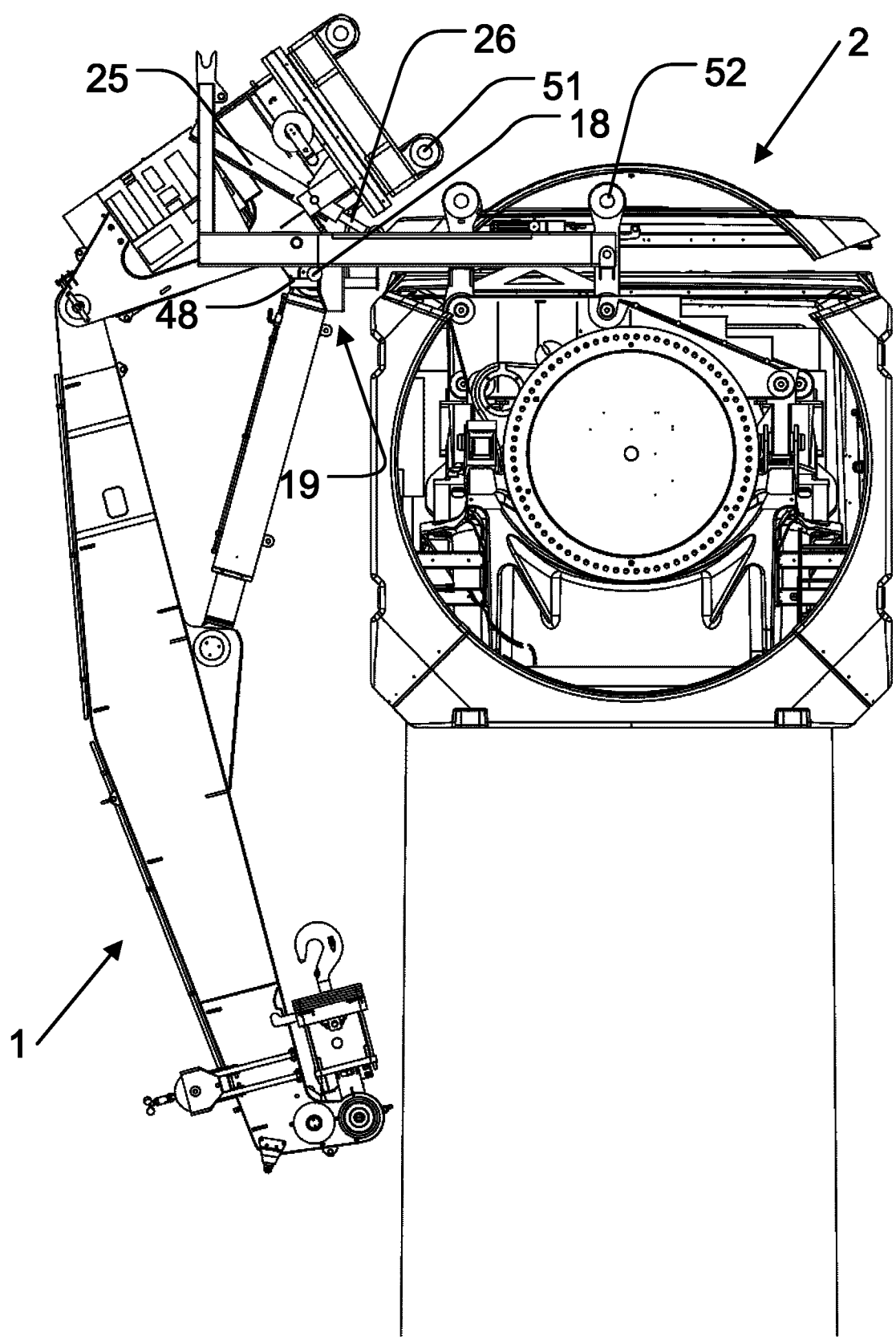
Figure 19:
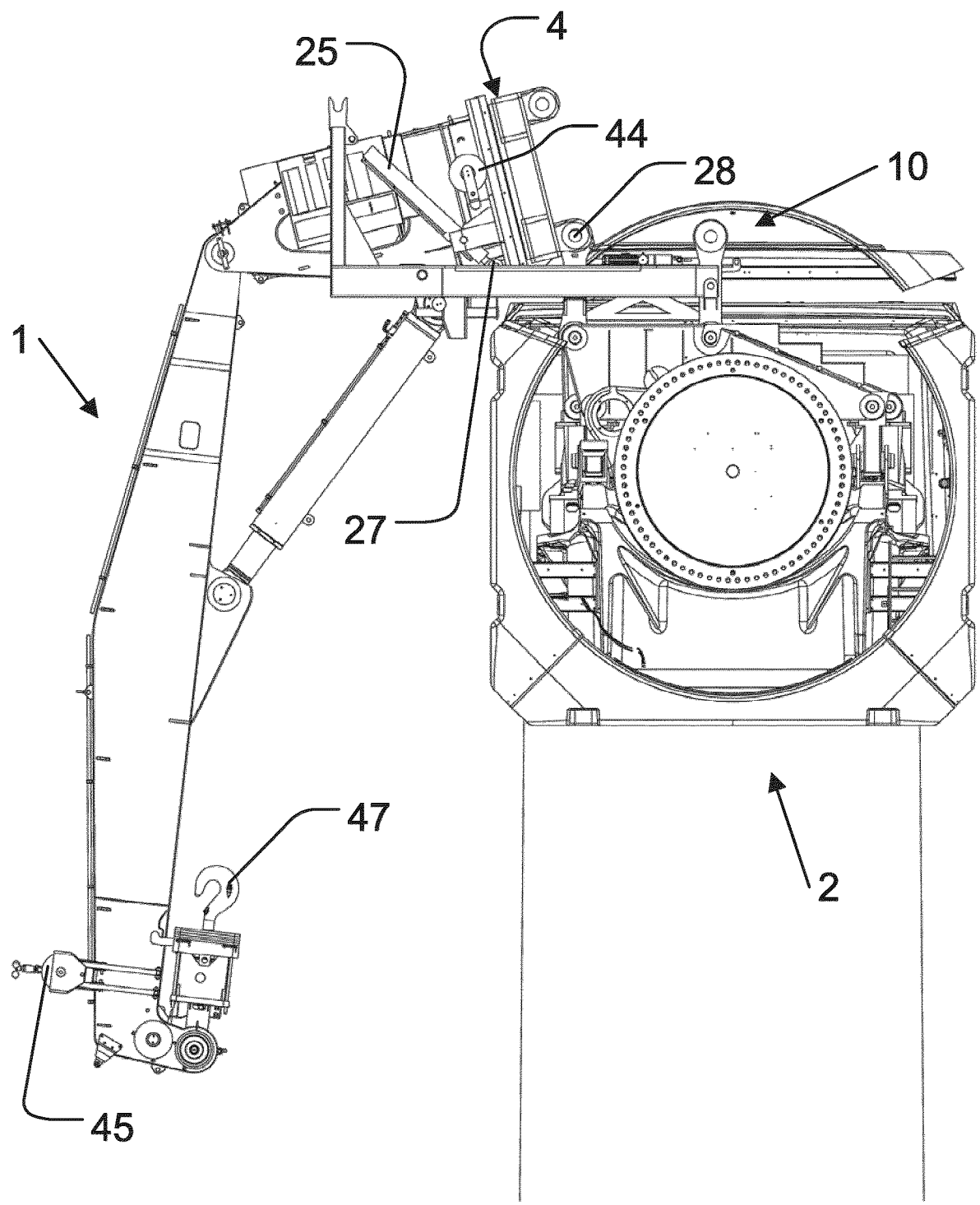
Figure 20:
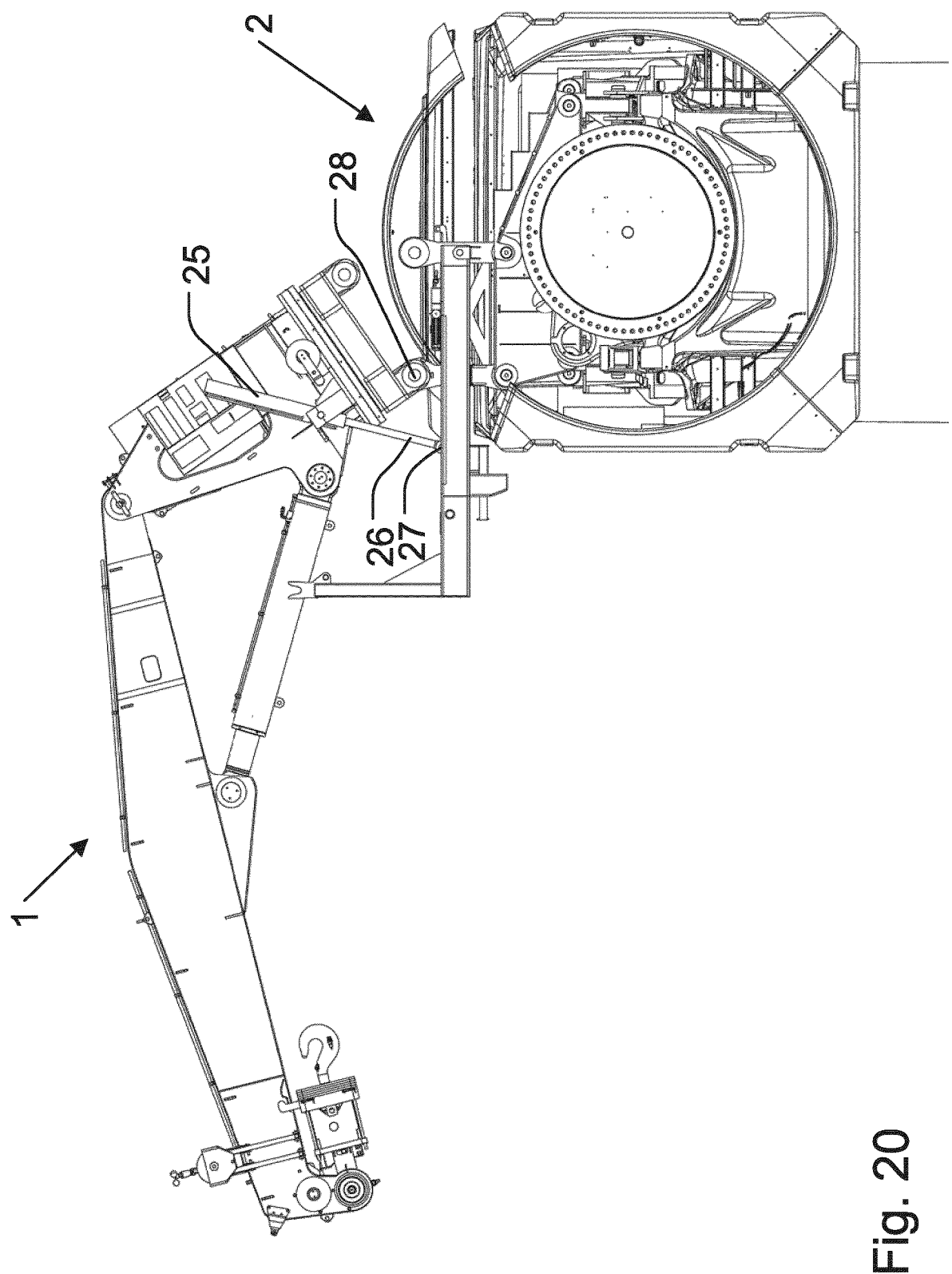
Figure 21:
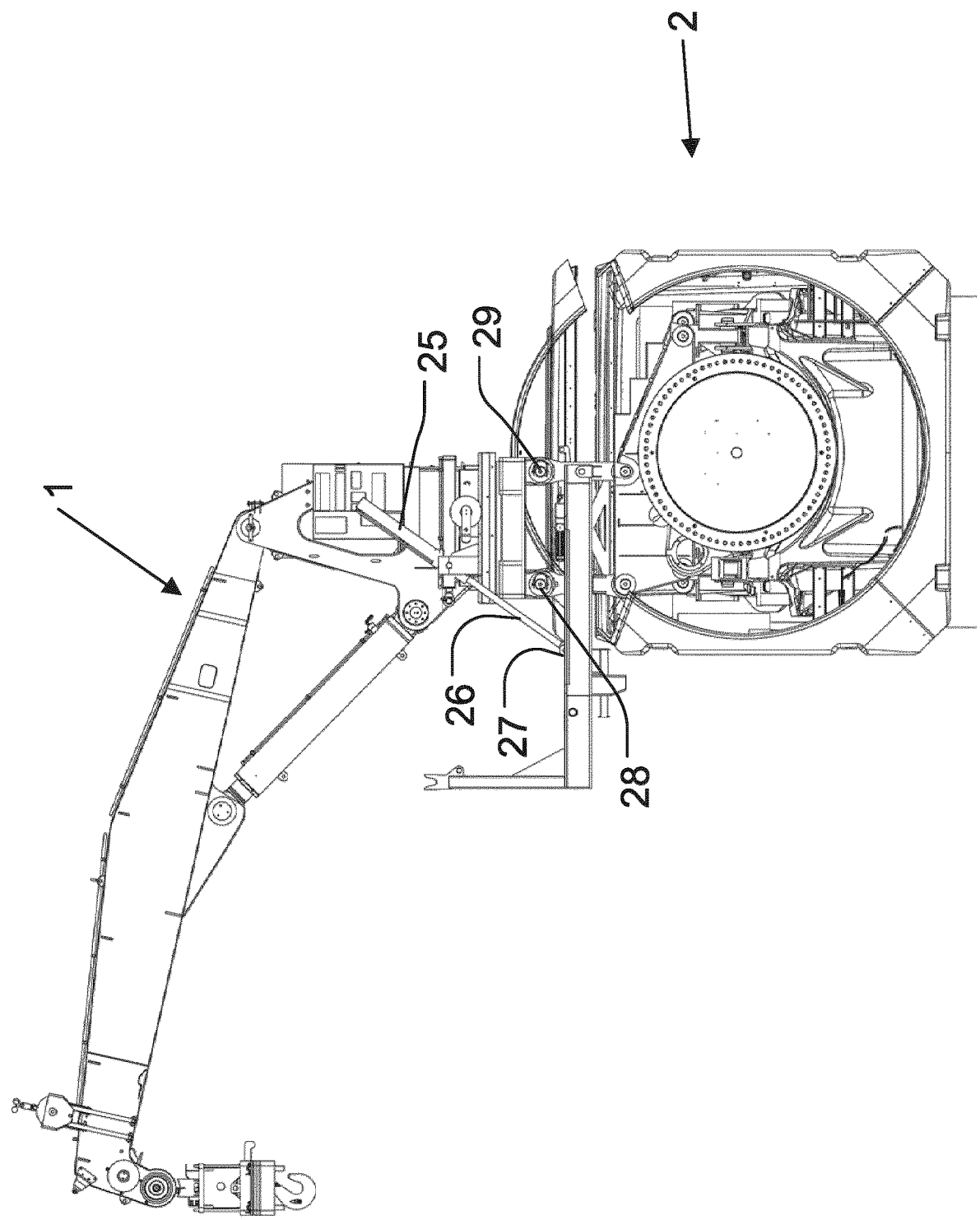
Figure 22:
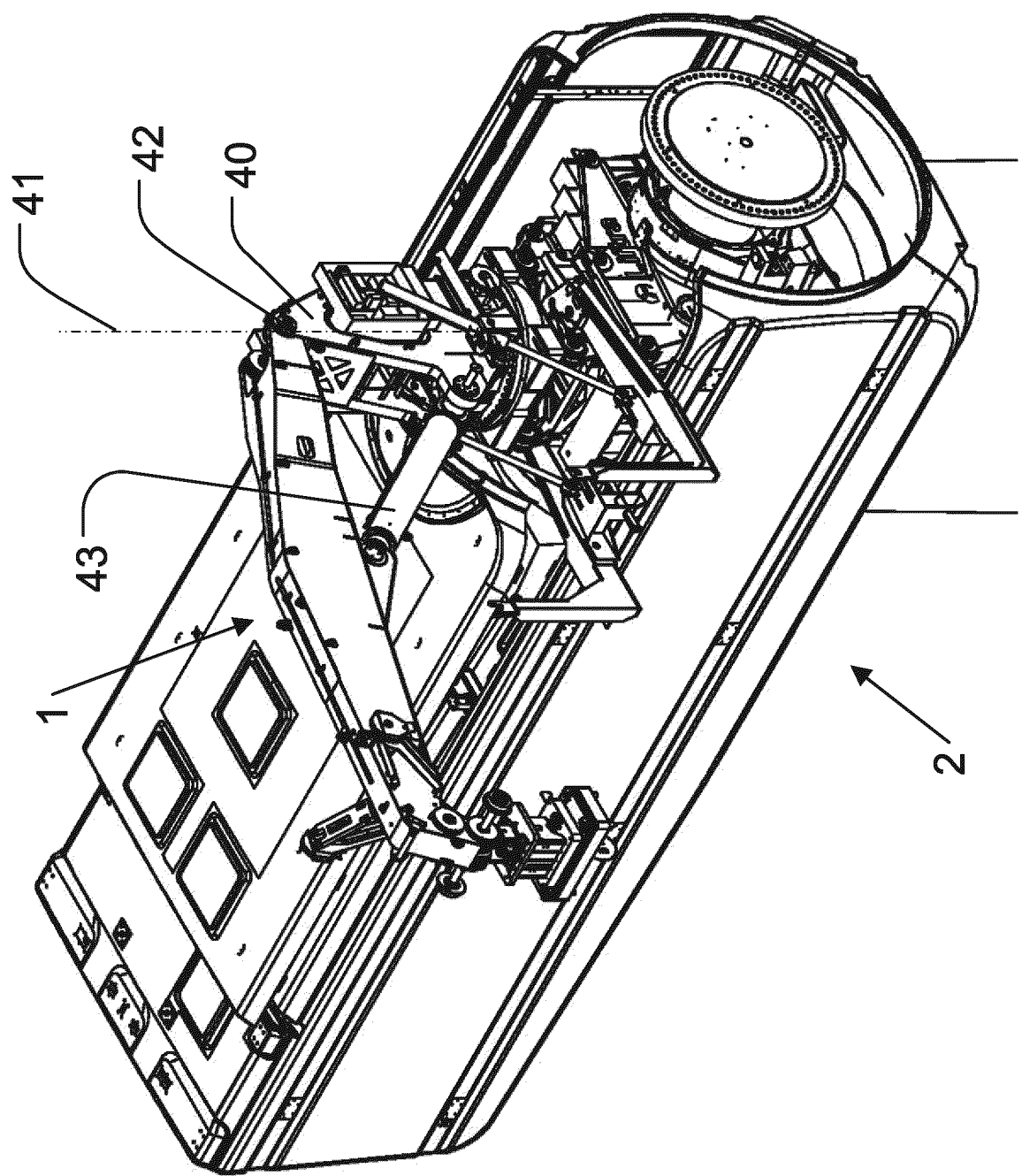

FIG. 14 is a perspective view of the self-hoisting crane being locked in the hinged position on the crane base, whereby raise cylinders of the crane have extended raise arms, releasable pivotal connections have been established between the raise arms and the crane base, and whereby a lightweight crane has lifted the hoisting block to a position just above the jib of the crane base arranged on the nacelle;

FIG. 15 is perspective view of the self-hoisting crane corresponding to that of FIG. 14, whereby the lightweight crane has lifted the hoisting block to a position further on the way to the second hoist block position at the mounting position of the pedestal on the crane base;

FIG. 16 is perspective view of the self-hoisting crane corresponding to that of FIG. 15, whereby the lightweight crane has lifted the hoisting block to a position just above the second hoist block position at the mounting position of the pedestal on the crane base;

FIG. 17 is perspective view of the self-hoisting crane corresponding to that of FIG. 16, whereby the lightweight crane has lowered the hoisting block fully to the second hoist block position at the mounting position of the pedestal on the crane base, and whereby the lightweight crane has been removed;

FIG. 18 is a side view of the self-hoisting crane of FIG. 17, whereby the raise cylinders have retracted their raise arms and thereby pivoted the crane about the intermediate hinge between the crane and the crane base, and whereby a boom cylinder of the crane has retracted its boom piston arm;

FIG. 19 is a side view of the self-hoisting crane corresponding to that of FIG. 18, whereby the raise cylinders have retracted their raise arms even further and thereby pivoted the crane to a first mounting position in which the pedestal has been connected to the crane base by means of two front base hinge pins;

FIG. 20 is a side view of the self-hoisting crane corresponding to that of FIG. 19, whereby the raise cylinders have extended their raise arms again and thereby pivoted the crane about the two front base hinge pins to a position nearer its final mounting position;

FIG. 21 is a side view of the self-hoisting crane corresponding to that of FIG. 20, whereby the raise cylinders have extended their raise arms further and thereby pivoted the crane about the two front base hinge pins to its final mounting position in which the pedestal has further been connected to the crane base by means of two back base hinge pins; and FIG. 22 is a perspective view of the self-hoisting crane of FIG. 21 in its final mounting position on the nacelle, ready for operation.

Figure 1:
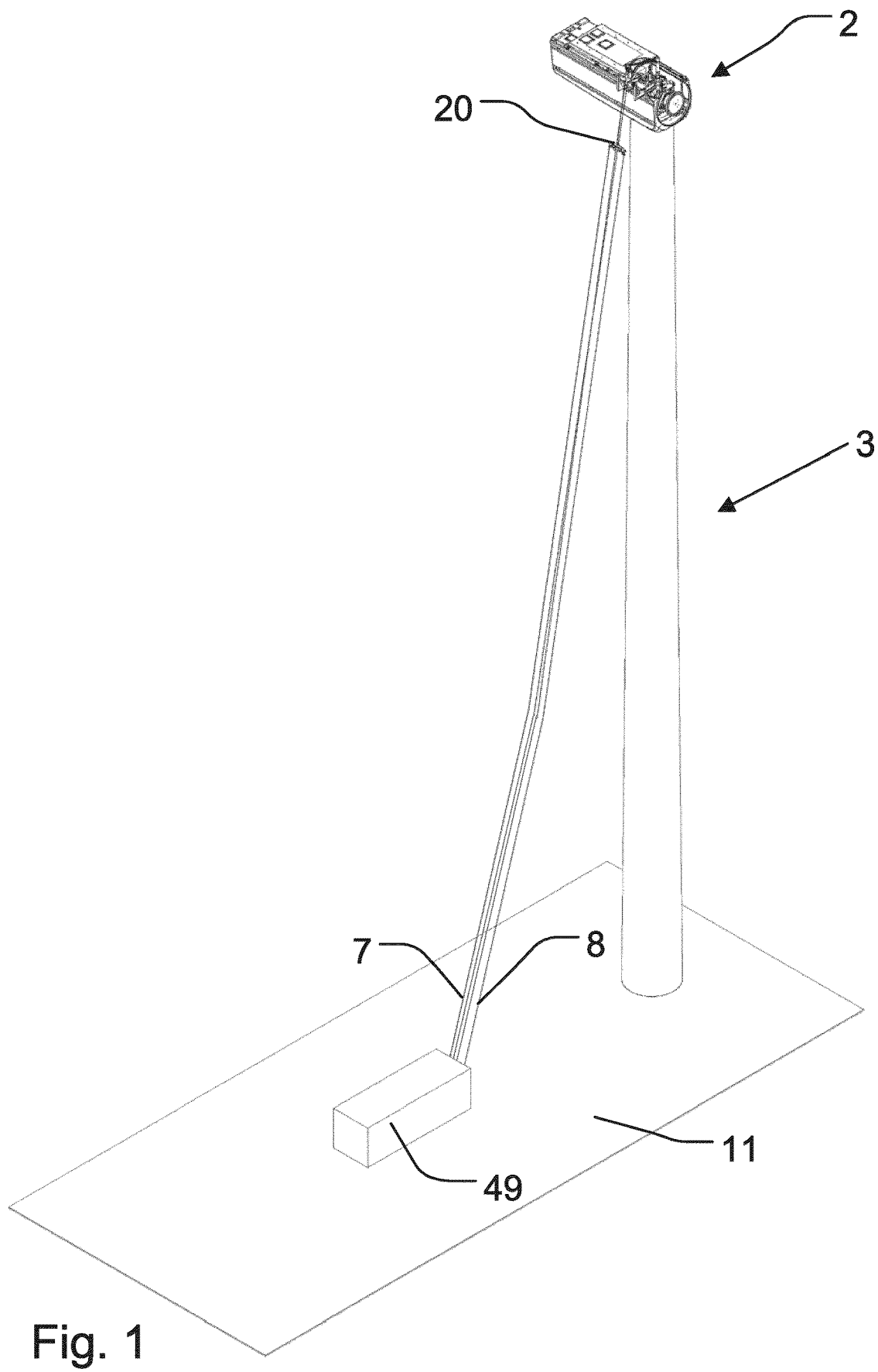
Figure 8:
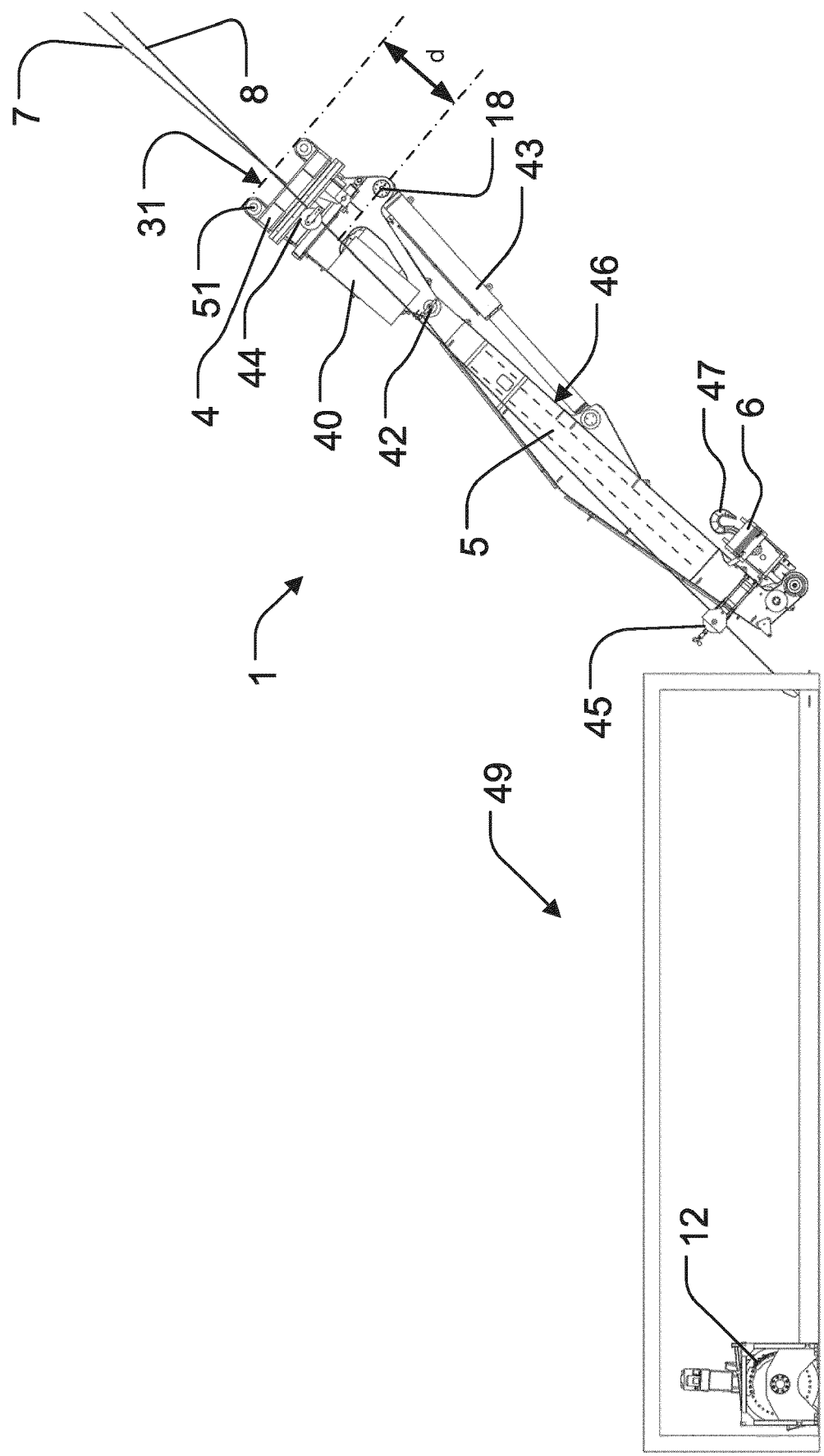
FIG. 8 is a side view of a self-hoisting crane being lifted up from a container arranged at ground level.
Figure 9:
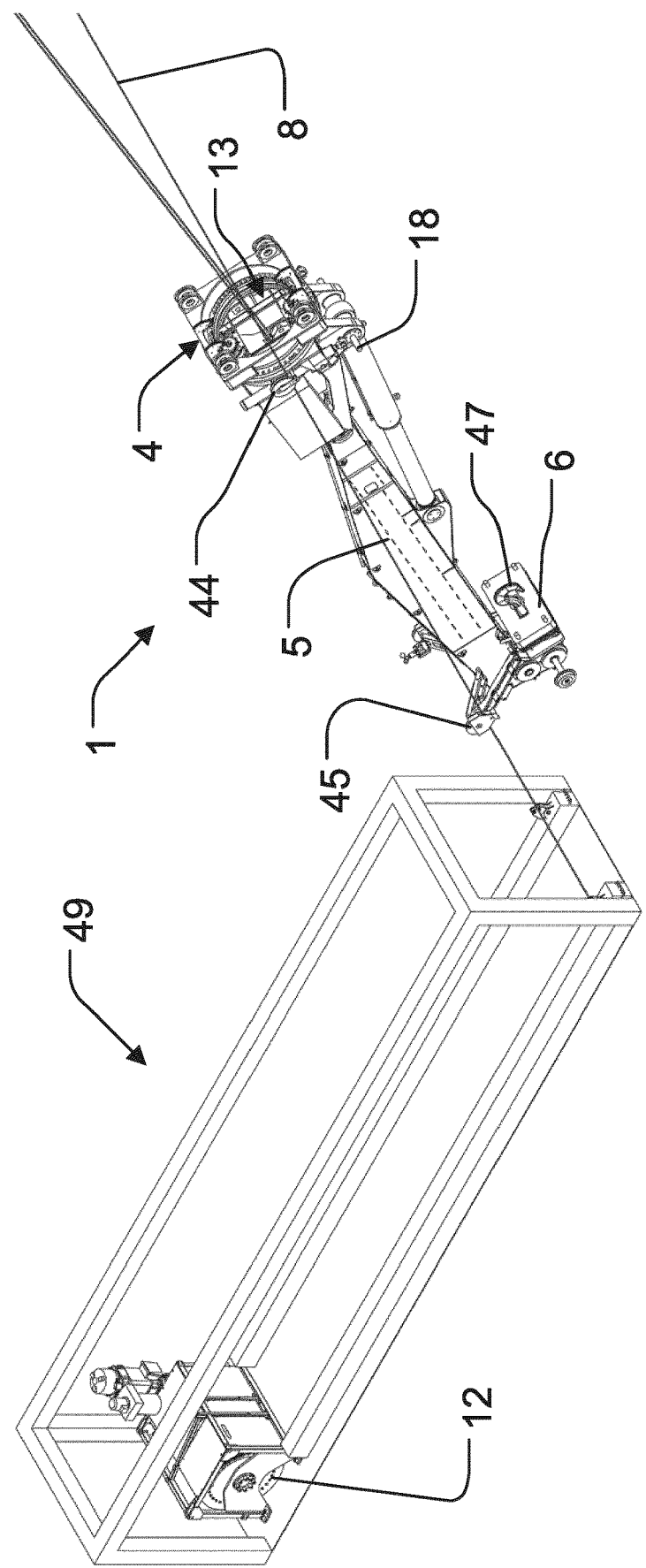
FIG. 9 is a perspective view of the self-hoisting crane of FIG. 8 being lifted further up from the container.
Figure 10:
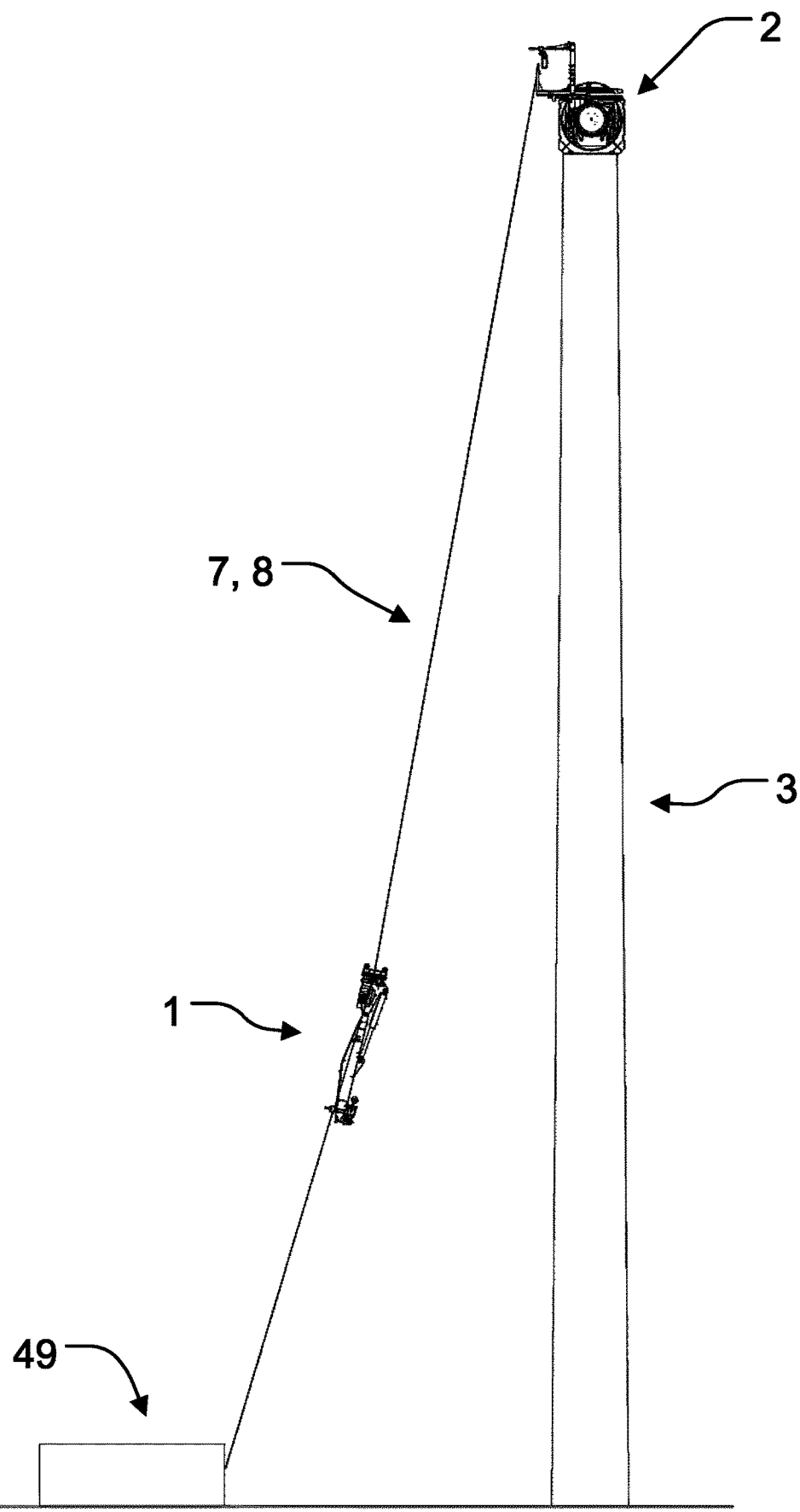
FIG. 10 is a side view of the wind turbine of FIG. 1 during lifting of the self-hoisting crane of FIG. 8 to the nacelle by means of a cable winch in the container and the hoisting block arranged on the nacelle.
Figure 11:
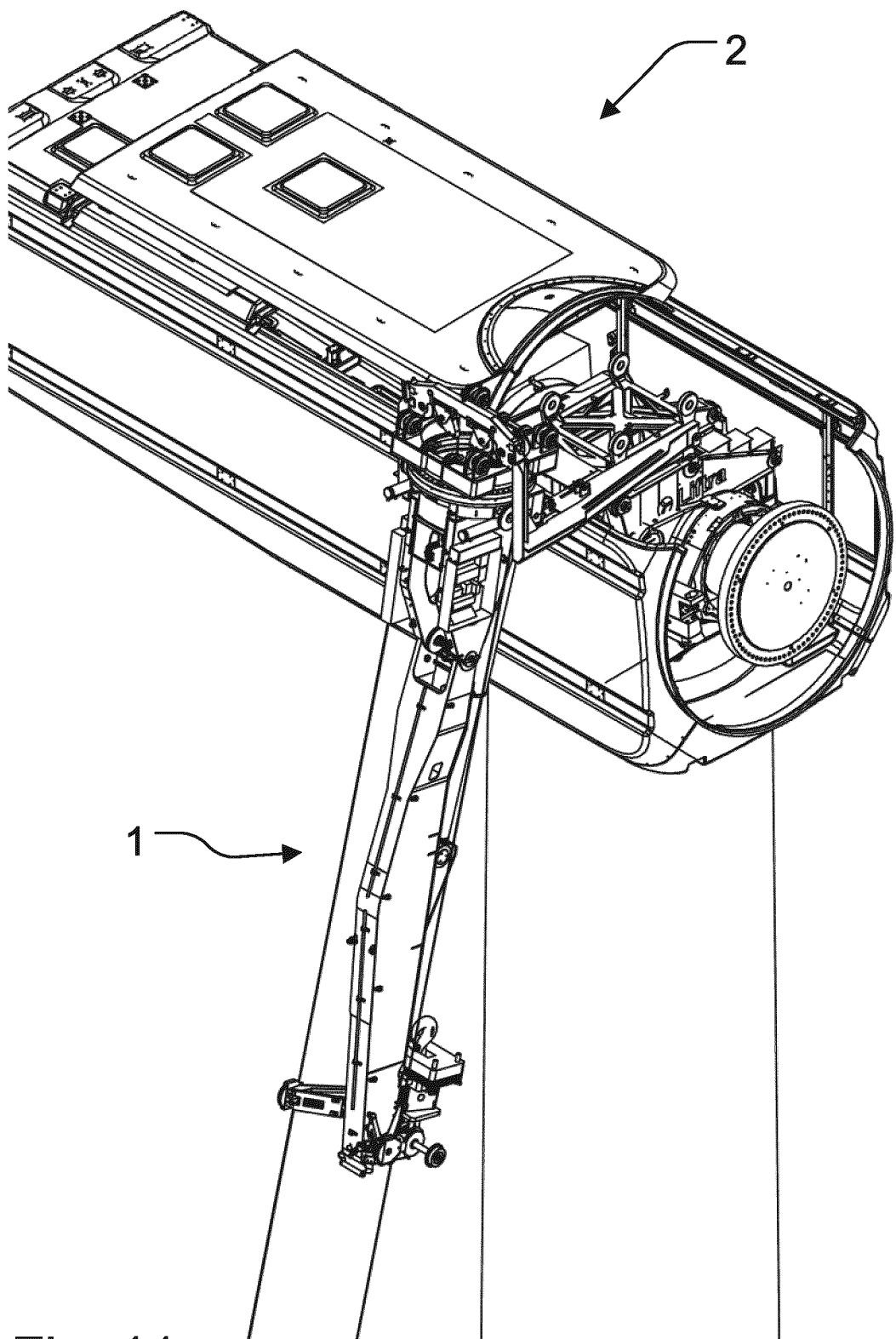
FIG. 11 is a perspective view of the self-hoisting crane of FIG. 8 arriving at the nacelle of the wind turbine of FIG. 10, before locking the crane in a hinged position on the crane base.

In the figures, an embodiment of the self-hoisting crane 1 according to the present invention is illustrated. According to the invention, some of the illustrated features of this embodiment are optional. FIGS. 8 and 9 illustrate the self-hoisting crane 1 adapted to be mounted on a nacelle 2 of a wind turbine 3 as seen in FIG. 1. The self-hoisting crane 1 includes a pedestal 4, a boom arm 5, a hook block 6 provided with a hook 47 and two cables 7, 8, preferably in the form of wires, such as metal wires, adapted to lift or lower the hook block 6 in relation to the boom arm 5 for operation of the self-hoisting crane 1 in its mounted position on the nacelle 2, as seen in FIG. 22.

Figure 4:
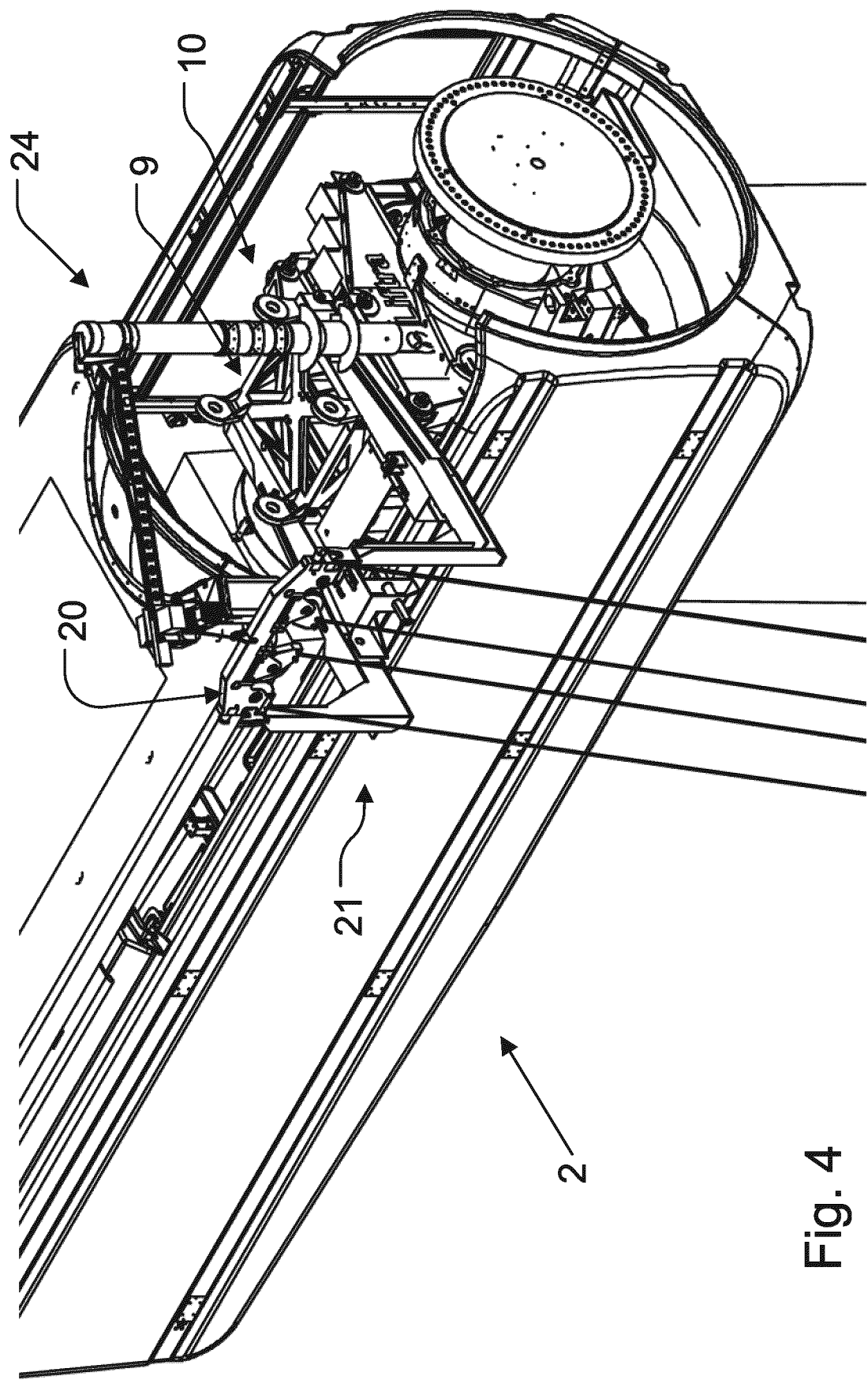
FIG. 4 is a view corresponding to that of FIG. 2, whereby the hoisting block has been lifted to a position just above a jib of a crane base arranged in the nacelle.
Figure 5:
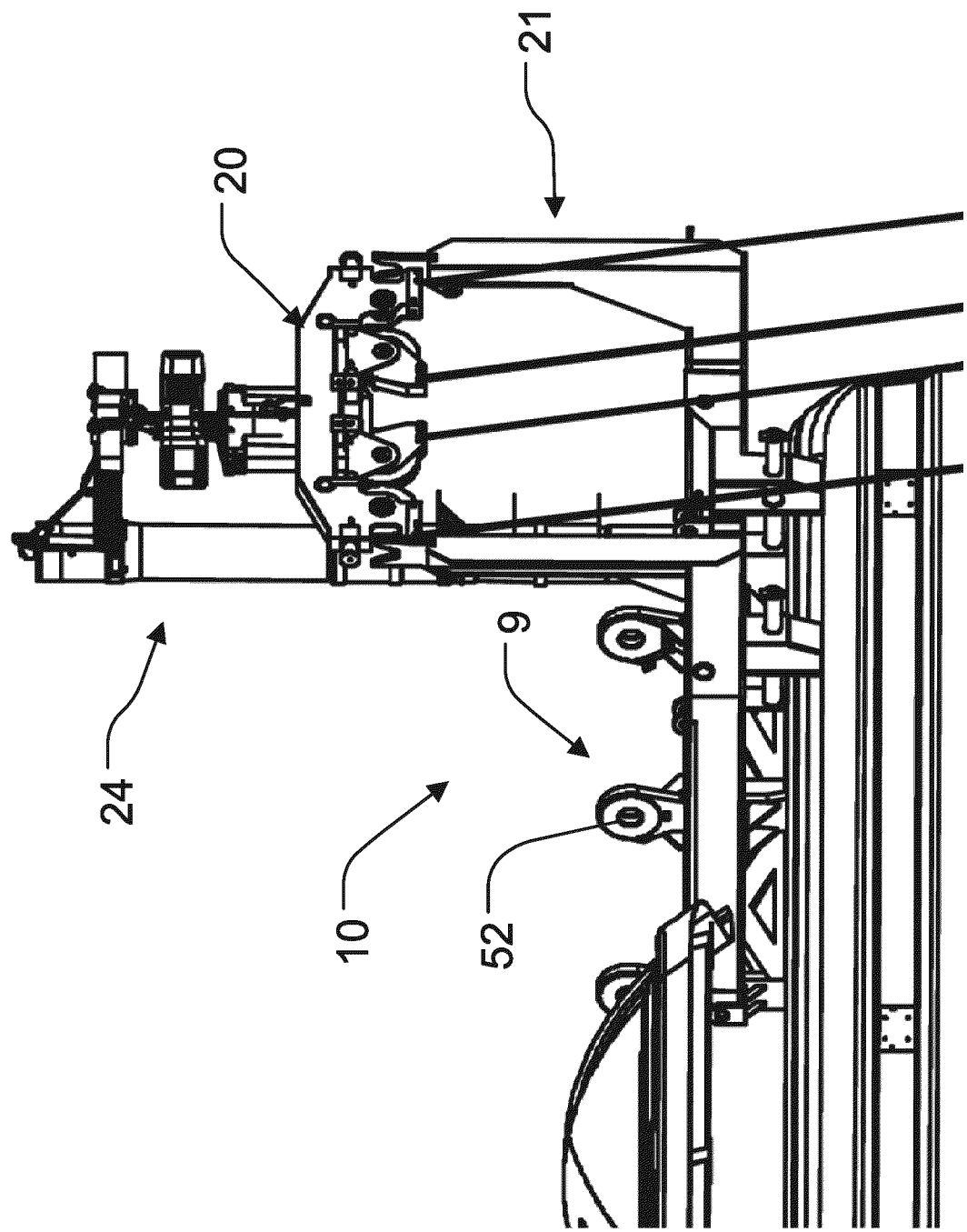
FIG. 5 is an oblique side view of the nacelle and hoisting block as seen in FIG. 4.

The self-hoisting crane 1 further includes a crane base 10 adapted to be arranged in the nacelle 2 as seen for instance in FIG. 4. Although in the illustrated embodiment, the crane base 10 is arranged at a position inside the nacelle 2, it is also possible to arrange the crane base 10 at other positions on the nacelle 2. The crane base 10 may be adapted to be arranged on the nacelle of a range of different types of wind turbines. A free mounting end 31 of the pedestal 4 is adapted to be mounted in a mounting position 9 on the crane base 10. Thereby, the pedestal 4 may be mounted on the crane base 10 with the boom arm 5 of the self-hoisting crane 1 arranged above the pedestal 4 for normal operation.

Figure 12:
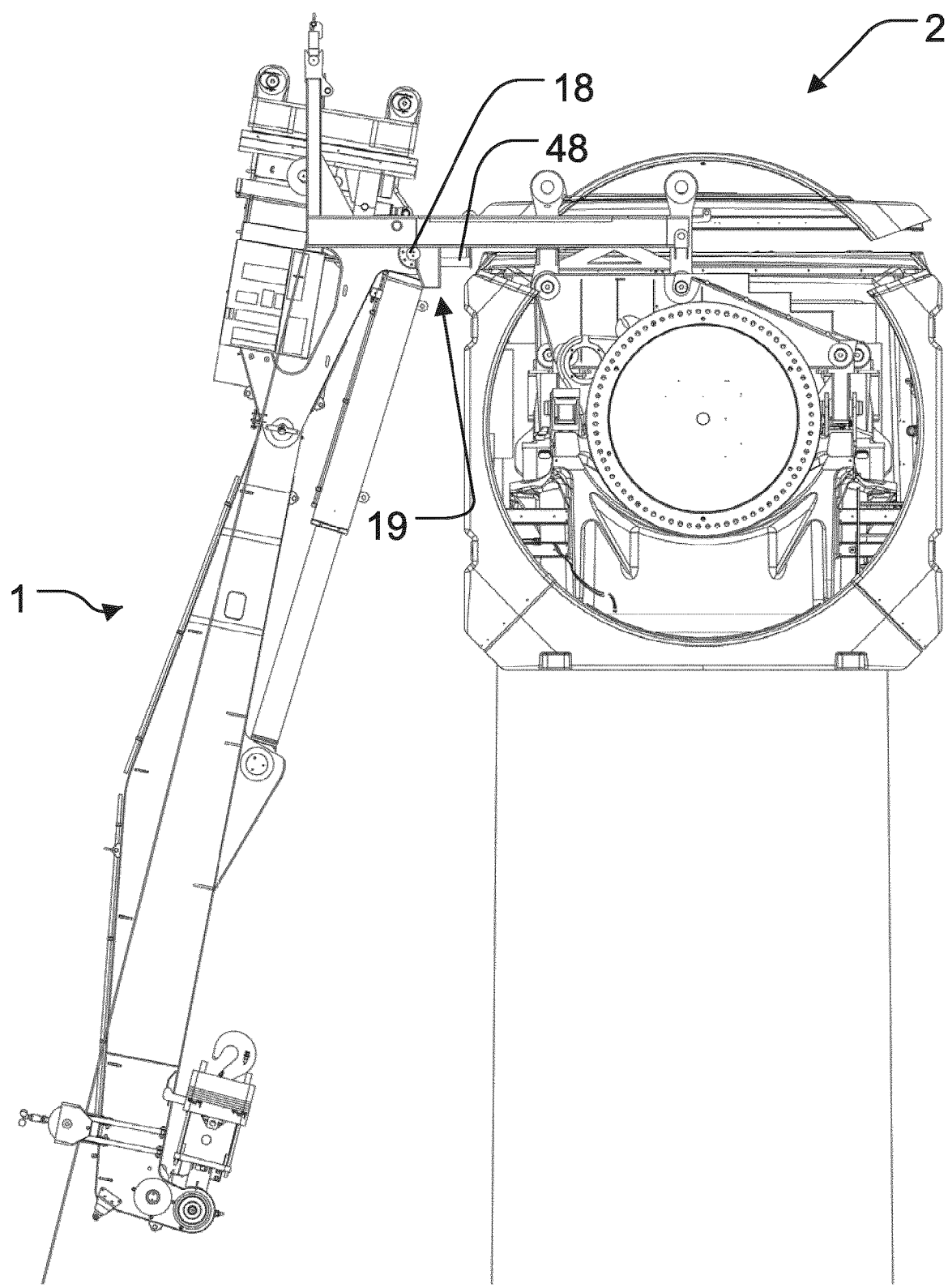
FIG. 12 is a side view of the self-hoisting crane arriving at the nacelle of the wind turbine as illustrated in FIG. 11.
Figure 13:
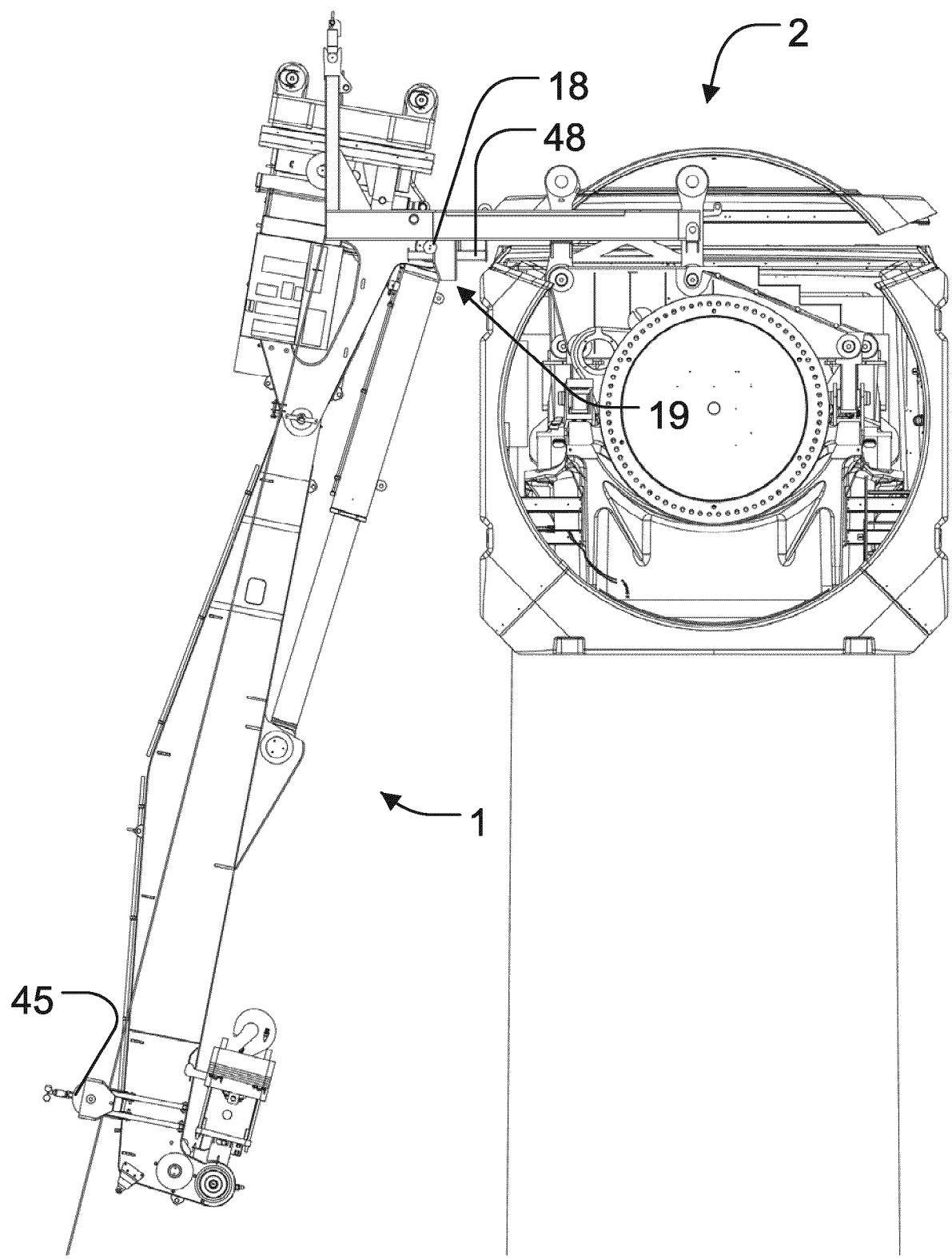
FIG. 13 is a side view of the self-hoisting crane corresponding to that of FIG. 12, but after locking the crane in a hinged position on the crane base.

The self-hoisting crane 1 is adapted to be hoisted from the ground 11 to the nacelle 2 by operating a cable winch 12 arranged at the ground 11 as seen in FIGS. 8 and 9. As seen in FIG. 9, the two cables 7, 8 are adapted to extend from the hook block 6 and out through a central opening 13 in the pedestal 4. From there, during hoisting of the crane 1, the cables 7, 8 extend further upwards to the crane base 10 on the nacelle 2, where they are led around the respective rollers 14, 15, 16, 17 arranged at the crane base 10. From there, the cables 7, 8 extend back downwards and to the cable winch 12 arranged at the ground 11. As illustrated in the figures, the self-hoisting crane 1 is adapted to be lifted from the ground 11 with the pedestal 4 pointing upwards until two intermediate first hinge parts 18 of the self-hoisting crane 1 is positioned at a corresponding respective intermediate second hinge parts 19 of the crane base 10 as seen in FIG. 12. The intermediate first and second hinge parts 18, 19 are adapted to be connected together in order to pivot the self-hoisting crane 1 about a hinge axis of the intermediate first and second hinge parts 18, 19. As illustrated in FIGS. 12 and 13, the connection is performed in that the intermediate first hinge parts 18 in the form of pins are lifted together with the crane 1 to a position wherein locking spindles 48 of the respective intermediate second hinge parts 19 may be axially displaced to a locking position in which the locking spindles 48 may support the respective pins forming the intermediate first hinge parts 18. The unlocked position of the locking spindles 48 is illustrated in FIG. 12, and the locking position is illustrated in FIG. 13.

Figure 6:
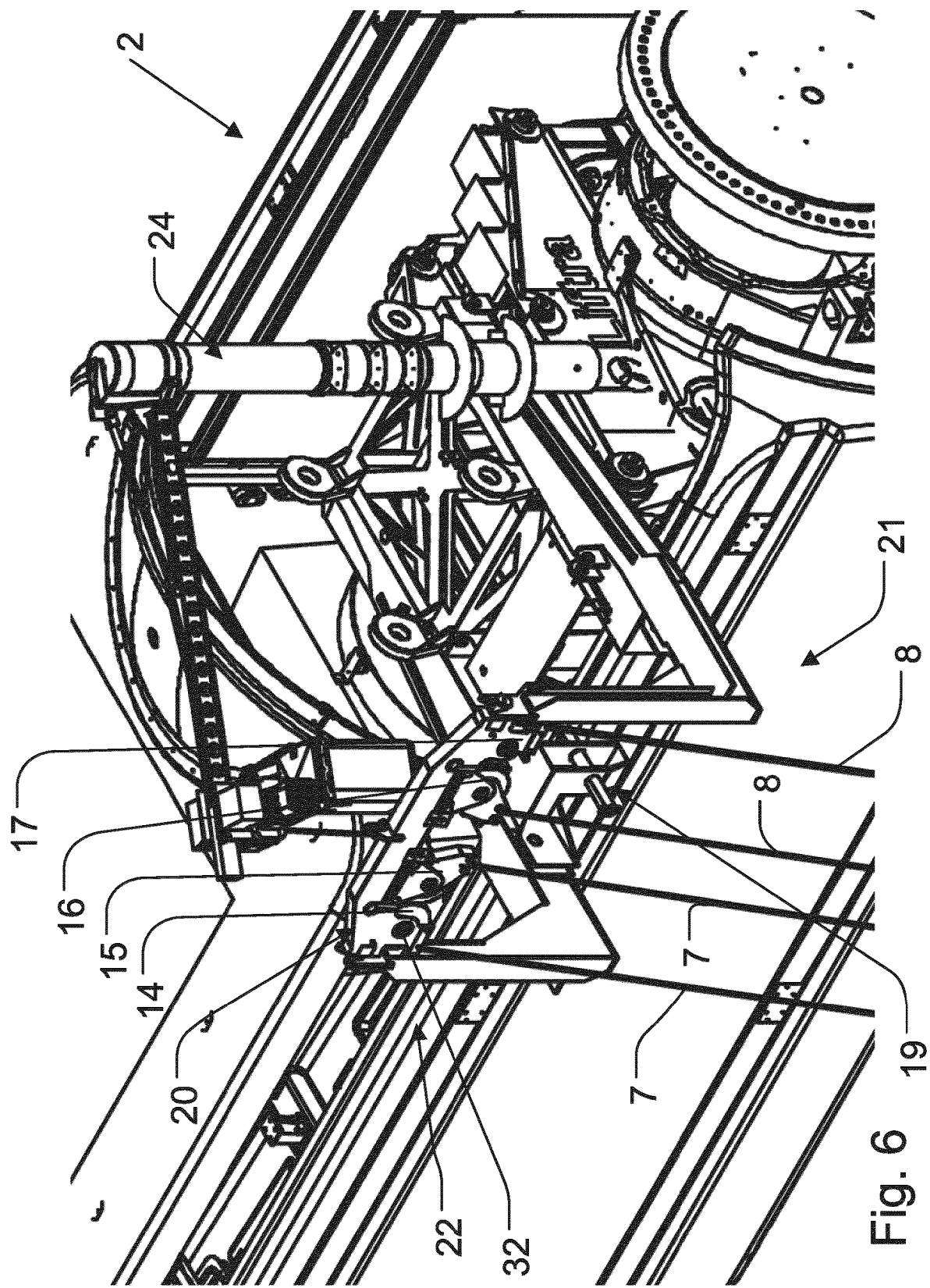
FIG. 6 is a view corresponding to that of FIG. 4, whereby the hoisting block has been placed in forks of the jib of the crane base.
Figure 7:
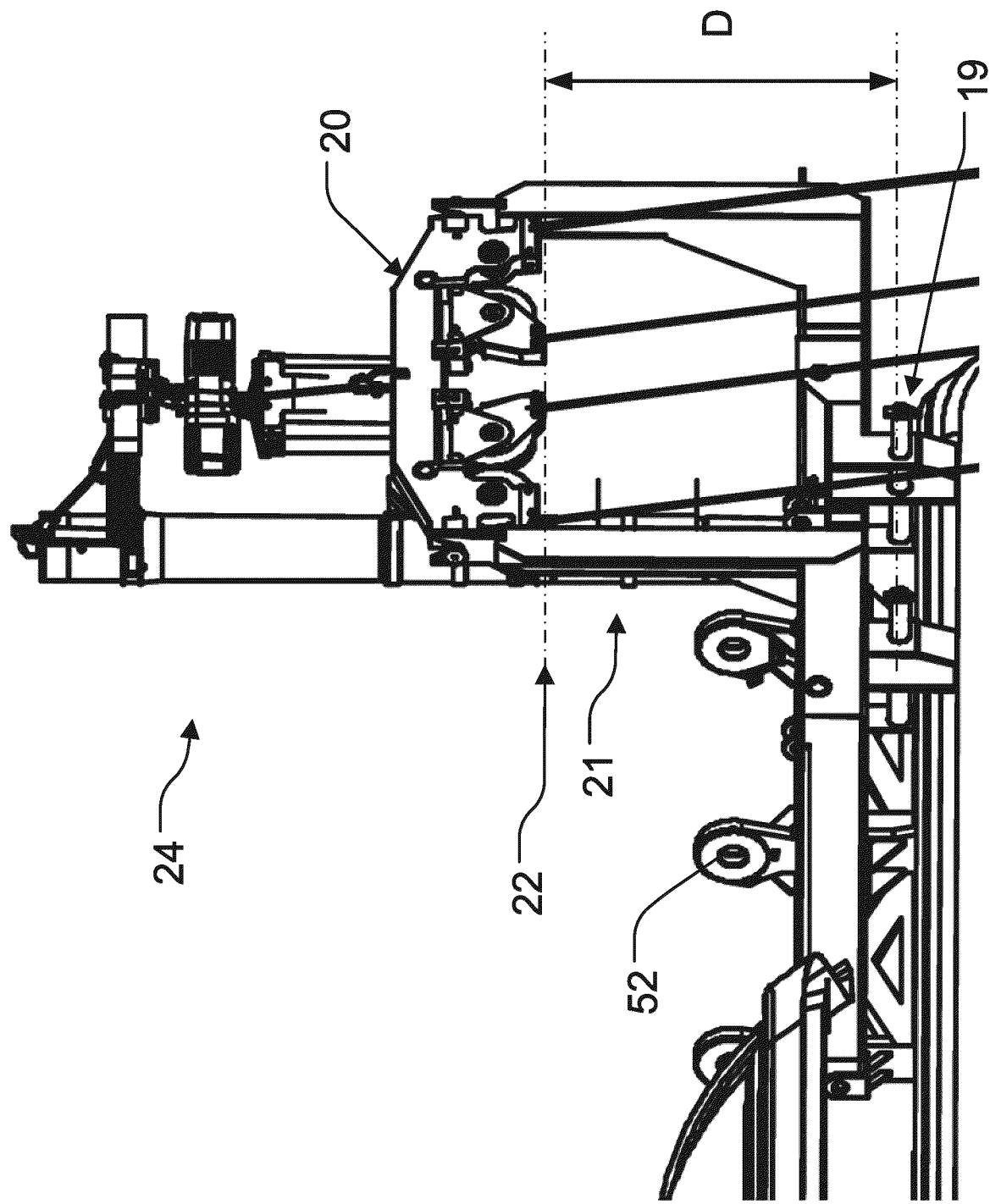
FIG. 7 is an oblique side view of the nacelle and hoisting block as seen in FIG. 6.

As seen in FIGS. 6 and 7, the rollers 14, 15, 16, 17 are arranged in a hoist block 20, and the crane base 10 includes a jib 21 adapted to, during lifting of the self-hoisting crane 1 to the nacelle 2, carry the hoist block 20 at a first hoist block position 22 above the intermediate second hinge part 19 of the crane base 10 and extended in horizontal direction from the nacelle 2, i.e. spaced horizontally from a wall of the nacelle 2. The vertical distance D from the intermediate second hinge part 19 of the crane base 10 to the first hoist block position 22, as indicated in FIG. 7, is longer than the distance d from the intermediate first hinge part 18 of the self-hoisting crane 1 to the free mounting end 31 of the pedestal 4, as indicated in FIG. 8. When measuring the vertical distance D from the intermediate second hinge part 19 of the crane base 10 to the first hoist block position 22, it is understood that the first hoist block position 22 is defined as the lower free side of the rollers 14, 15, 16, 17 of the hoist block 20 as seen in FIG. 7, because then the resulting distance D is the decisive distance for whether the pedestal 4 of the crane 1 may be lifted to the necessary height. When measuring the distance d it is understood that the free mounting end 31 of the pedestal 4 is the outermost end position on the pedestal 4 which in the illustrated embodiment is the free end of the lugs in which the hinge holes 51 are formed as also seen in FIG. 8.

The hoist block 20 is releasably attachable to the jib 21 in order to be removed from its first hoist block position 22 after hoisting the self-hoisting crane 1 and thereby allow passage of the crane 1 through the first hoist block position 22 when pivoting the crane 1 about the hinge axis of the intermediate first and second hinge parts 18, 19, as illustrated in FIGS. 18 to 20.

In the illustrated embodiment, the hoist block 20 is adapted to, after mutual connection of the intermediate first and second hinge parts 18, 19, be moved from its first hoist block position 22 to a second hoist block position 23 at the mounting position 9 of the pedestal 4 on the crane base 10, as seen in FIG. 17. Thereby, the crane base 10 is adapted to releasably receive and hold the hoist block 20 at the second hoist block position 23 for the operation of the self-hoisting crane 1 in its mounted position on the nacelle 2.

Furthermore, in the illustrated embodiment, as seen in FIGS. 14 to 16, the crane base 10 and the hoist block 20 are adapted so that the hoist block 20 may be lifted by means of a lightweight crane 24 arranged on the nacelle 2 from the first hoist block position 22 to the second hoist block position 23. For that purpose, the hoist block 20 is provided with a lifting eye 50 on its top.

As seen in FIG. 6, the jib 21 and the hoist block 20 are adapted so that the hoist block 20 when mounted in its first hoist block position 22 on the jib 21 is pivotal in relation to the jib about a pivot axis 30 being perpendicular to the respective axes of rotation 32 of each of the rollers 14, 15, 16, 17 of the hoist block 20. The jib 21 has two spaced arms 33, 34 each being provided with an upwardly open fork-like element 35, 36 in which a respective pivot pin 37, 38 of the hoist block 20 may rest, as seen for instance in FIG. 2.

Figure 2:
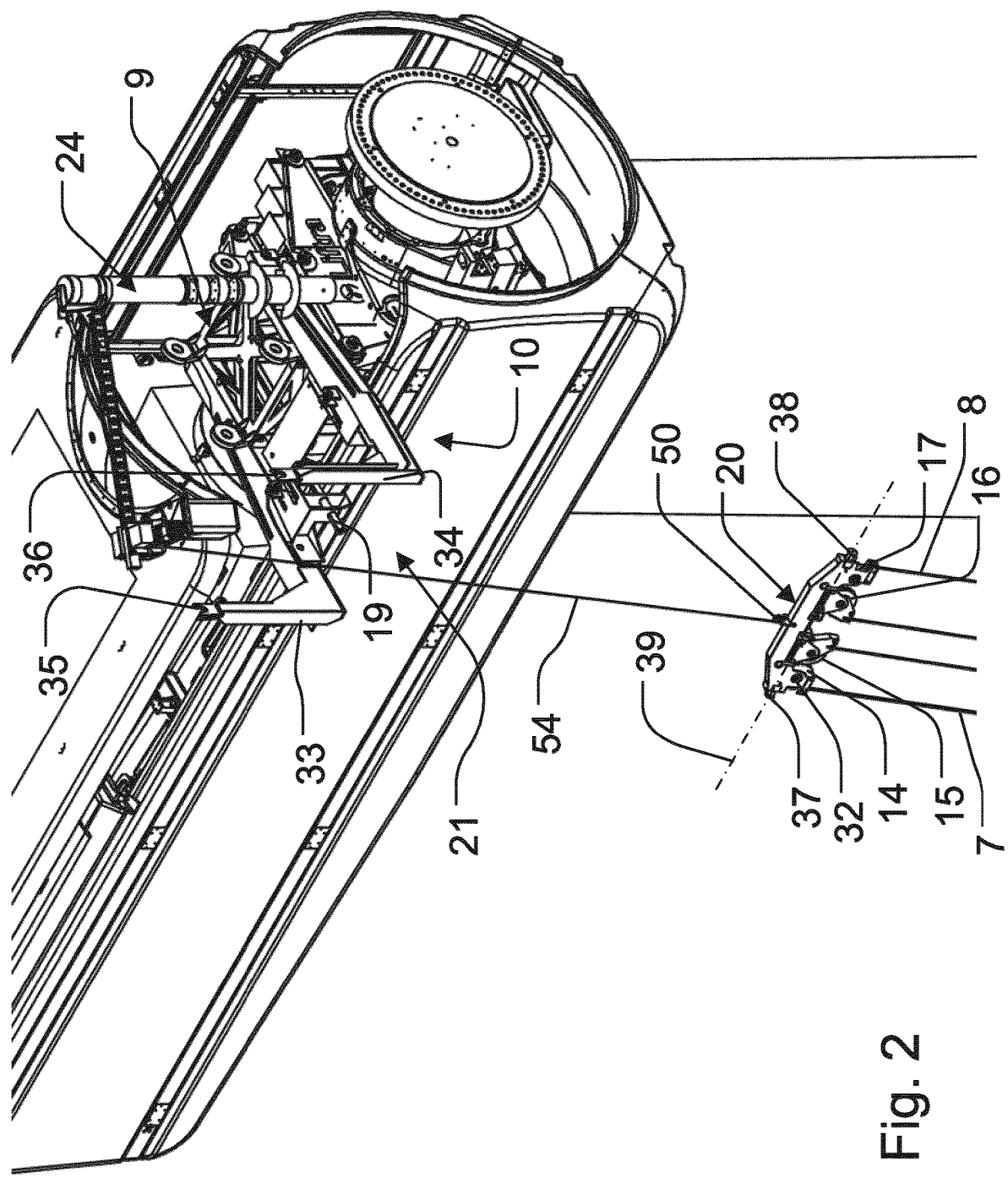
FIG. 2 illustrates the nacelle and hoisting block of FIG. 1 on a larger scale.
Figure 3:
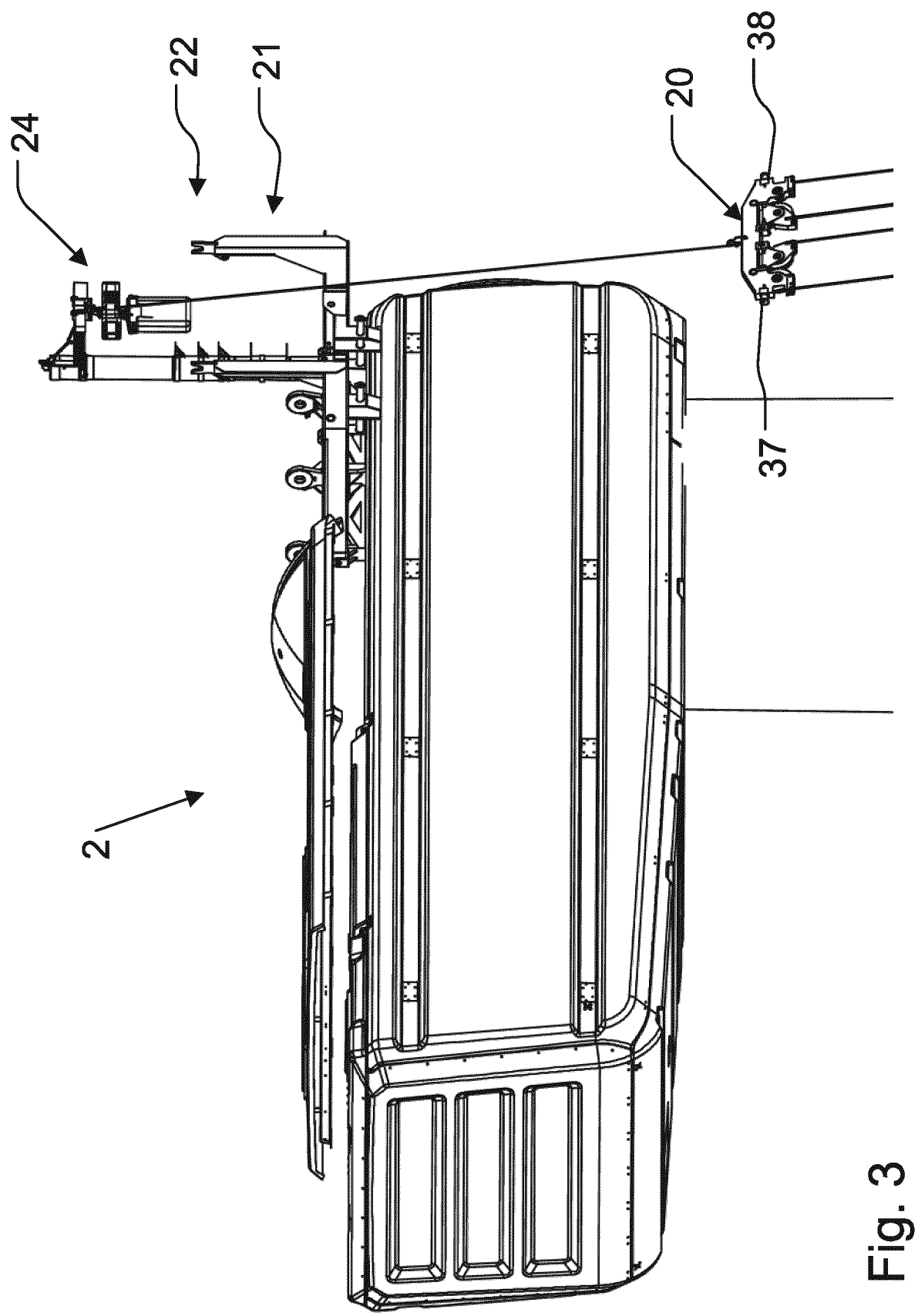
FIG. 3 is an oblique side view of the nacelle and hoisting block as seen in FIG. 2.

As seen in FIG. 2, the hoist block 20 is formed as an elongated element being provided at either end with extending pivot pins 37, 38 arranged coaxially with a longitudinal axis 39 of the hoist block 20. The hoist block 20 has two outer rollers 14, 17 arranged at the respective ends of the hoist block 20 and two inner rollers 15, 16 arranged between the outer rollers 14, 17. The outer and inner rollers 14, 15, 16, 17 are arranged with their axes 32 at a distance from the longitudinal axis 39 of the hoist block 20 and at right angles to the longitudinal axis 39. However, in other embodiments, the outer and inner rollers 14, 15, 16, 17 may be arranged in different ways, and their axes 32 do not need to be at right angles to the longitudinal axis 39 of the hoist block 20. In the illustrated embodiment, however, the axes 32 of the outer rollers 14, 17 are fixed in relation to the elongated element, whereas the axes 32 of the inner rollers 15, 16 are pivotal in relation to the elongated element about an axis being parallel with the longitudinal axis 39 of the hoist block 20 and extending at the periphery of the inner rollers 15, 16 where the cable is arranged in a peripheral track of the rollers 15, 16. In this way, when the hoist block 20 is arranged in its first hoist block position 22 on the jib 21 as illustrated in FIG. 6, during lifting of the crane 1 from the ground 11 to the nacelle 2, the hoist block 20 may adapt its rotational position to the varying angle with the vertical of the four extended parts of two cables 7, 8 being redirected in the hoist block 20. On the other hand, when the hoist block 20 is arranged in its second hoist block position 23 at the mounting position 9 of the pedestal 4 on the crane base 10, as illustrated in FIG. 17, and when the crane 1 is mounted at its final position on the nacelle 2, two innermost cable parts extending from the hoist block 20 and up through the central opening 13 in the pedestal 4 of the crane 1 may suitably adapt their angle to the vertical by rotation of the axes 32 of the two inner rollers 15, 16 about the axis being parallel with or co-axial with the longitudinal axis 39 of the hoist block 20. In this second hoist block position 23, in the final position of the crane 1 and during tilting of the crane 1 to its final position, the cables 7, 8 originating in the crane 1 and passing the respective inner rollers 15, 16, are further led about the respective outer rollers 14, 17 and from there, the cables pass over respective auxiliary rollers 53 of crane base, as illustrated in FIG. 14.

As seen in FIGS. 8 and 9, the self-hoisting crane 1 further includes an arm base 40 arranged rotatably about an arm base axis 41 on the pedestal 4. The arm base axis 41 is vertical in the operational position of the self-hoisting crane 1, as indicated in FIG. 22. The boom arm 5 is arranged pivotally about a boom arm axis 42 on the arm base 40. As seen in FIG. 22, the boom arm axis 42 is horizontal in the operational position of the self-hoisting crane 1. A linear boom actuator 43 is arranged between the arm base 40 and the boom arm 5 and is displaceable between a retracted position in which the boom arm 5 is lowered in the operational position of the self-hoisting crane 1 and an extended position in which the boom arm 5 is lifted in the operational position of the self-hoisting crane 1, as it is understood from FIG. 22. As seen in FIGS. 8 and 9, the arm base 40 is provided with two arm base rollers 44 arranged at either side of the arm base 40 and adapted to roll on the respective cables 7, 8 extending from the cable winch 12 on the ground 11 to the hoist block 20. As further seen, a hook block end of the boom arm 5 is provided with two boom arm rollers 45 arranged at either side of the boom arm 5 and adapted to roll on the respective cables 7, 8 extending from the cable winch 12 to the hoist block 20. As seen in FIGS. 8 and 9, in the extended position of the linear boom actuator 43, a centre of gravity 46 of the self-hoisting crane 1 is positioned below a straight line between the axis of the arm base rollers 44 and the axis of the boom arm rollers 45 when the base rollers 44 and the boom arm rollers 45 roll on their respective cables 7, 8 and the linear boom actuator 43 is positioned under the boom arm 5 during hoisting of the self-hoisting crane 1 to the nacelle 2 of a wind turbine 3. In the figures, such a straight line is formed by either one of the cables 7, 8. By arranging the centre of gravity 46 of the self-hoisting crane 1 below said straight line, the crane 1 may be lifted in a stable position and the hoisting procedure and subsequent mounting of the crane 1 on the nacelle 2 may thereby be facilitated in that additional measures for stabilising the crane 1 during its hoisting may be dispensed with.

According to the method of mounting the self-hoisting crane 1 on a nacelle 2 of a wind turbine 3 according to the present invention, preferably, before lifting the self-hoisting crane 1 from the ground 11 to the nacelle 2, the hoist block 20 is lifted from the ground 11 to its first hoist block position 22 on the jib 21 by means of a lightweight crane 24 arranged on the nacelle 2 as illustrated in FIGS. 1 to 7. During lifting of the hoist block 20 from the ground 11 to its first hoist block position 22, the two cables 7, 8 of the self-hoisting crane 1 extend from the self-hoisting crane positioned at the ground 11, up to the hoist block 20 and around respective rollers 14, 15, 16, 17 of the hoist block 20, and down to the cable winch 12 on the ground 11. As seen for instance in FIGS. 2 and 6, the first cable 7 seen to the left in the figures extends in the direction from the self-hoisting crane 1 firstly about the left inner roller 15, then about the left outer roller 14 and further to the cable winch 12. Likewise, the second cable 8 seen to the right in the figures extends in the direction from the self-hoisting crane 1 firstly about the right inner roller 16, then about the right outer roller 17 and further to the cable winch 12.

When the hoist block 20 has been placed in its first hoist block position 22 on the jib 21 as seen in FIGS. 6 and 7, the self-hoisting crane 1 is hoisted from the ground 11 to the nacelle 2 by operating the cable winch 12 arranged at the ground 11. As seen in FIGS. 8 and 9, the self-hoisting crane 1 is lifted up from a container 49 in which it has been transported to the location on ground and in which the cable winch 12 is also arranged.

As already explained above, the self-hoisting crane 1 is lifted from the ground with the pedestal 4 pointing upwards and so that the two arm base rollers 44 and the two boom arm rollers 45 roll on the respective outermost parts of the cables 7, 8 extending from the cable winch 12 on the ground 11 to respectively the left outer roller 14 of the hoist block 20 and the right outer roller 17 of the hoist block. Thereby, the centre of gravity 46 of the self-hoisting crane 1 is positioned below a straight line between the axis of the arm base rollers 44 and the axis of the boom arm rollers 45. During lifting of the crane 1, the hoist block 20 is pivoted about a pivot axis 30 being at least substantially perpendicular to an axis of rotation 32 of each of the rollers 14, 15, 16, 17 of the hoist block 20, thereby conforming to the varying angle of the cables 7, 8.

Furthermore, during lifting of the self-hoisting crane 1 to the nacelle 2, when the self-hoisting crane 1 arrives at the position whereby the intermediate first hinge parts 18 of the self-hoisting crane 1 are positioned at the corresponding intermediate second hinge parts 19 of the crane base 10, the cables 7, 8 extend in a downward direction directly from the respective rollers 15, 16 of the hoist block 20 and through the central opening 13 in the pedestal 4, and therefrom to the hook block 6. After mutual connection of the intermediate first and second hinge parts 18, 19 as explained above, the hoist block 20 is removed from its first hoist block position 22 on the jib 21.

Preferably, before the hoist block 20 is removed from its first hoist block position 22 on the jib 21, a pair of linear raise actuators 25 arranged on either side of the self-hoisting crane is activated to extend respective raise arms 26, and a releasable pivotal connection 27 is established between each raise arm 26 and the crane base 10 as illustrated in FIG. 14. Thereby, the pivotal position of the crane 1 may be controlled by means of the linear raise actuators 25 before the tension of the cables 7, 8 is slacked, and thereby, the mounting procedure may generally be facilitated.

Preferably, as seen in FIGS. 14 to 17, the hoist block 20 is repositioned from its first hoist block position 22 on the jib 21 to its second hoist block position 23 at the mounting position 9 of the pedestal 4 on the crane base 10 by means of a lightweight crane 24 arranged on the nacelle 2. As seen, the hoist block 20 is provided with the lifting eye 50 on its top.

As seen in FIGS. 18 and 19, after the hoist block 20 has been removed from its first hoist block position 22 on the jib 21, the linear raise actuators 25 are activated to retract the raise arms 26 whereby the self-hoisting crane 1 is pivoted about the hinge axis of the intermediate first and second hinge parts 18, 19. After the self-hoisting crane 1 has been pivoted about said hinge axis, the crane 1 has reached the position illustrated in FIG. 19, wherein the pedestal 4 may be connected to the crane base 10 by means of two front base hinge pins 28 being inserted in corresponding hinge holes 51, 52 at either side of the pedestal 4 and at either side of the crane base 10. Subsequently, the intermediate first and second hinge parts 18, 19 are disconnected from each other, and the linear raise actuators 25 are activated to extend the raise arms 26 whereby the self-hoisting crane 1 is pivoted about the front base hinge pins 28 as illustrated in FIG. 20. When the final mounting position of the self-hoisting crane 1 on the crane base 10 has been reached, as illustrated in FIG. 21, the pedestal 4 is further connected to the crane base 10 by means of two back base hinge pins 29 being inserted in corresponding hinge holes 51, 52 at either side of the pedestal 4 and at either side of the crane base 10. In its final position on the crane base 10, the crane 1 may be operated by the cable winch 12 at the ground.

LIST OF REFERENCE NUMBERS 1 self-hoisting crane
2 nacelle
3 wind turbine
4 pedestal of self-hoisting crane
5 boom arm of self-hoisting crane
6 hook block of self-hoisting crane
7, 8 cable of self-hoisting crane
9 mounting position of pedestal on crane base
10 crane base
11 ground
12 cable winch
12 central opening in pedestal
14 left outer roller of hoist block
15 left inner roller of hoist block
16 right inner roller of hoist block
17 right outer roller of hoist block
18 intermediate first hinge part of self-hoisting crane
19 intermediate second hinge part of crane base
20 hoist block
21 jib
22 first hoist block position
23 second hoist block position
24 lightweight crane on nacelle
25 linear raise actuator on self-hoisting crane
26 raise arm of linear raise actuator
27 releasable pivotal connection
28 front base hinge pin
29 back base hinge pin
30 pivot axis of hoist block
31 free mounting end of pedestal
32 axis of rotation of roller of hoist block
33, 34 arm of jib
35, 36 upwardly open fork-like element
37, 38 pivot pin of hoist block
39 longitudinal axis of hoist block
40 arm base
41 arm base axis
42 boom arm axis
43 linear boom actuator
44 arm base roller
45 boom arm roller
46 centre of gravity
47 hook
48 locking spindle of intermediate second hinge part
49 container
50 lifting eye
51 hinge hole of pedestal
52 hinge hole of crane base
53 auxiliary roller of crane base
54 cable of lightweight crane

The invention claimed is:

1. A self-hoisting crane adapted to be mounted on a nacelle of a wind turbine, wherein the self-hoisting crane includes a pedestal, a boom arm, a hook block and at least one cable adapted to lift or lower the hook block in relation to the boom arm for operation of the self-hoisting crane in its mounted position on the nacelle, the self-hoisting crane further including a crane base adapted to be arranged on the nacelle, wherein a free mounting end of the pedestal is adapted to be mounted in a mounting position on the crane base, wherein the self-hoisting crane is adapted to be hoisted from the ground to the nacelle by operating a cable winch arranged at the ground, wherein the at least one cable is adapted to extend from the hook block, out through a central opening in the pedestal, around at least one roller arranged at the crane base and to the cable winch arranged at the ground, wherein the self-hoisting crane is adapted to be lifted from the ground with the pedestal pointing upwards until an intermediate first hinge part of the self-hoisting crane is positioned at a corresponding intermediate second hinge part of the crane base, wherein the intermediate first and second hinge parts are adapted to be connected together in order to pivot the self-hoisting crane about a hinge axis of the intermediate first and second hinge parts, and wherein the pedestal is adapted to be mounted on the crane base with the boom arm of the self-hoisting crane arranged above the pedestal for normal operation, wherein the at least one roller is arranged in a hoist block, in that the crane base includes a jib adapted to, during lifting of the self-hoisting crane to the nacelle, carry the hoist block at a first hoist block position above the intermediate second hinge part of the crane base and extended in horizontal direction from the nacelle, in that the vertical distance from the intermediate second hinge part of the crane base to the first hoist block position is longer than the distance from the intermediate first hinge part of the self-hoisting crane to the free mounting end of the pedestal, and in that the hoist block is releasably attached to the jib in order to be removed from its first hoist block position and thereby allow passage of the self-hoisting crane through the first hoist block position when pivoting the self-hoisting crane about the hinge axis of the intermediate first and second hinge parts.

2. A self-hoisting crane according to claim 1, wherein the hoist block is adapted to, after mutual connection of the intermediate first and second hinge parts, be moved from its first hoist block position to a second hoist block position at the mounting position of the pedestal on the crane base, and wherein the crane base is adapted to releasably receive and hold the hoist block at the second hoist block position for the operation of the self-hoisting crane in its mounted position on the nacelle.

3. A self-hoisting crane according to claim 2, wherein the crane base and the hoist block are adapted so that the hoist block may be lifted by means of a lightweight crane arranged on the nacelle from the first hoist block position to the second hoist block position.

4. A self-hoisting crane according to claim 1, wherein the jib and the hoist block are adapted so that the hoist block when mounted in its first hoist block position on the jib is pivotal in relation to the jib.

5. A self-hoisting crane according to claim 4, wherein the jib has two spaced arms each being provided with an upwardly open fork-like element in which a respective pivot pin of the hoist block may rest.

6. A self-hoisting crane according to claim 1, wherein the hoist block is formed as an elongated element being provided at either end with extending pivot pins arranged coaxially with a longitudinal axis of the hoist block, wherein the hoist block has two outer rollers arranged at the respective ends of the hoist block and two inner rollers arranged between the outer rollers, wherein the outer and inner rollers are arranged with their axes at a distance from the longitudinal axis of the hoist block and at right angles to the longitudinal axis, wherein the axes of the outer rollers are fixed in relation to the elongated element, and wherein the axes of the inner rollers are pivotal in relation to the elongated element about an axis being parallel with or co-axial with the longitudinal axis of the hoist block.

7. A self-hoisting crane according to claim 1, wherein the self-hoisting crane further includes an arm base arranged rotatably about an arm base axis on the pedestal, the arm base axis being vertical in the operational position of the self-hoisting crane, wherein the boom arm is arranged pivotally about a boom arm axis on the arm base, the boom arm axis being horizontal in the operational position of the self-hoisting crane, wherein a linear boom actuator is arranged between the arm base and the boom arm and is displaceable between a retracted position in which the boom arm is lowered in the operational position of the self-hoisting crane and an extended position in which the boom arm is lifted in the operational position of the self-hoisting crane, wherein the arm base is provided with at least one arm base roller adapted to roll on a cable extending from a cable winch on the ground to the hoist block, wherein a hook block end of the boom arm is provided with at least one boom arm roller adapted to roll on a cable extending from a cable winch on the ground to the hoist block, wherein, in the extended position of the linear boom actuator, a centre of gravity of the self-hoisting crane is below a straight line between the respective axes of the at least one arm base roller and of the at least one boom arm roller when the at least one base roller and the at least one boom arm roller roll on their corresponding cables and the linear boom actuator is positioned under the boom arm during hoisting of the self-hoisting crane to the nacelle of a wind turbine.

8. A method of mounting a self-hoisting crane on a nacelle of a wind turbine, whereby the self-hoisting crane includes a pedestal, a boom arm, a hook block and at least one cable adapted to lift or lower the hook block in relation to the boom arm for operation of the self-hoisting crane in its mounted position on the nacelle, whereby the pedestal is adapted to be mounted in a mounting position on a crane base arranged on the nacelle, whereby the self-hoisting crane is hoisted from the ground to the nacelle by operating a cable winch arranged at the ground, whereby, during hoisting of the self-hoisting crane, the at least one cable extends from the hook block, out through a central opening in the pedestal, around at least one roller arranged at the crane base and to the cable winch arranged at the ground, whereby the self-hoisting crane is lifted from the ground with the pedestal pointing upwards until an intermediate first hinge part of the self-hoisting crane is positioned at a corresponding intermediate second hinge part of the crane base, whereby the intermediate first and second hinge parts are connected together and the self-hoisting crane is pivoted about a hinge axis of the intermediate first and second hinge parts, and whereby the pedestal is mounted on the crane base with the boom arm of the self-hoisting crane arranged above the pedestal for normal operation, wherein, before lifting the self-hoisting crane from the ground to the nacelle, a hoist block including the at least one roller is arranged on a jib at a first hoist block position above the intermediate second hinge part of the crane base and extended in horizontal direction from the nacelle, in that, during lifting of the self-hoisting crane to the nacelle, when the self-hoisting crane arrives at the position whereby the intermediate first hinge part of the self-hoisting crane is positioned at the corresponding intermediate second hinge part of the crane base, the cable extends in a downward direction directly from the at least one roller of the hoist block and through the central opening in the pedestal and therefrom to the hook block, and in that, after mutual connection of the intermediate first and second hinge parts, the hoist block is removed from its first hoist block position on the jib.

9. A method of mounting a self-hoisting crane according to claim 8, wherein, after mutual connection of the intermediate first and second hinge parts, the hoist block is repositioned from its first hoist block position on the jib to a second hoist block position at the mounting position of the pedestal on the crane base.

10. A method of mounting a self-hoisting crane according to claim 9, wherein, before the hoist block is removed from its first hoist block position on the jib, at least one linear raise actuator arranged on the self-hoisting crane is activated to extend a raise arm, and a releasable pivotal connection is established between the raise arm and the crane base.

11. A method of mounting a self-hoisting crane according to claim 9, wherein, during lifting of the self-hoisting crane to the nacelle, the hoist block is pivoted about a pivot axis being at least substantially perpendicular to an axis of rotation of the at least one roller of the hoist block.

12. A method of mounting a self-hoisting crane according to claim 9, wherein the hoist block is repositioned from its first hoist block position on the jib to its second hoist block position at the mounting position of the pedestal on the crane base by means of a lightweight crane arranged on the nacelle.

13. A method of mounting a self-hoisting crane according to claim 12, wherein, before the hoist block is removed from its first hoist block position on the jib, at least one linear raise actuator arranged on the self-hoisting crane is activated to extend a raise arm, and a releasable pivotal connection is established between the raise arm and the crane base.

14. A method of mounting a self-hoisting crane according to claim 12, wherein, during lifting of the self-hoisting crane to the nacelle, the hoist block is pivoted about a pivot axis being at least substantially perpendicular to an axis of rotation of the at least one roller of the hoist block.

15. A method of mounting a self-hoisting crane according to claim 8, wherein, before the hoist block is removed from its first hoist block position on the jib, at least one linear raise actuator arranged on the self-hoisting crane is activated to extend a raise arm, and a releasable pivotal connection is established between the raise arm and the crane base.

16. A method of mounting a self-hoisting crane according to claim 15, wherein, during lifting of the self-hoisting crane to the nacelle, the hoist block is pivoted about a pivot axis being at least substantially perpendicular to an axis of rotation of the at least one roller of the hoist block.

17. A method of mounting a self-hoisting crane according to claim 15, wherein, after the hoist block has been removed from its first hoist block position on the jib, the at least one linear raise actuator is activated to retract the raise arm whereby the self-hoisting crane is pivoted about the hinge axis of the intermediate first and second hinge parts.

18. A method of mounting a self-hoisting crane according to claim 17, wherein, after the self-hoisting crane has been pivoted about the hinge axis of the intermediate first and second hinge parts, the pedestal is connected to the crane base by means of at least one front base hinge pin, the intermediate first and second hinge parts are disconnected from each other, the at least one linear raise actuator is activated to extend the raise arm whereby the self-hoisting crane is pivoted about the at least one front base hinge pin until the final mounting position of the self-hoisting crane on the crane base is reached, and the pedestal is further connected to the crane base by means of at least one back base hinge pin.

19. A method of mounting a self-hoisting crane according to claim 8, wherein, during lifting of the self-hoisting crane to the nacelle, the hoist block is pivoted about a pivot axis being at least substantially perpendicular to an axis of rotation of the at least one roller of the hoist block.

20. A method of mounting a self-hoisting crane according to claim 8, wherein, before lifting the self-hoisting crane from the ground to the nacelle, the hoist block is lifted from the ground to its first hoist block position on the jib by means of a lightweight crane arranged on the nacelle, and wherein, during lifting of the hoist block from the ground to its first hoist block position, the at least one cable of the self-hoisting crane extends from the self-hoisting crane positioned at the ground, up to the hoist block and around the at least one roller of the hoist block, and down to the cable winch on the ground.

\* \* \* \* \*